(12) United States Patent
Perng et al.

(10) Patent No.: US 11,736,585 B2
(45) Date of Patent: Aug. 22, 2023

(54) GENERIC PROXY ENDPOINTS USING PROTOCOL TUNNELS INCLUDING LIFE CYCLE MANAGEMENT AND EXAMPLES FOR DISTRIBUTED CLOUD NATIVE SERVICES AND APPLICATIONS

(71) Applicant: NUTANIX, INC., San Jose, CA (US)

(72) Inventors: Shyan-Ming Perng, San Jose, CA (US); Akhilesh Joshi, San Jose, CA (US); Anuraag Deepak Advani, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/187,220

(22) Filed: Feb. 26, 2021

(65) Prior Publication Data

US 2022/0279046 A1 Sep. 1, 2022

(51) Int. Cl.
H04L 67/563 (2022.01)
H04L 12/46 (2006.01)
H04L 67/2866 (2022.01)
H04L 67/133 (2022.01)
H04L 67/567 (2022.01)

(52) U.S. Cl.
CPC ........ *H04L 67/563* (2022.05); *H04L 12/4633* (2013.01); *H04L 67/133* (2022.05); *H04L 67/2866* (2013.01); *H04L 67/567* (2022.05)

(58) Field of Classification Search
CPC ............. H04L 12/4633; H04L 67/2814; H04L 67/2838; H04L 67/2866; H04L 67/40
USPC ....................................................... 709/227
See application file for complete search history.

(56) References Cited

U.S. PATENT DOCUMENTS

| 7,237,360 | B2 | 7/2007 | Moncho et al. |
| 7,310,664 | B1 | 12/2007 | Merchant et al. |
| 8,543,665 | B2 | 9/2013 | Ansari et al. |
| 8,549,518 | B1 | 10/2013 | Aron et al. |
| 8,601,473 | B1 | 12/2013 | Aron et al. |

(Continued)

FOREIGN PATENT DOCUMENTS

| CN | 101916200 B | 8/2015 |
| CN | 110795442 B | 4/2022 |

(Continued)

OTHER PUBLICATIONS

VMware, Meeting at the Edge with VMware Internet of Things (IoT), pp. 1-9, Apr. 2017 (Year: 2017).*

(Continued)

*Primary Examiner* — David P Zarka
(74) *Attorney, Agent, or Firm* — Stoel Rives LLP

(57) ABSTRACT

Applications or Agents or Administrators can communicate with services and/or applications at hosted and/or remote locations via proxy service or application endpoints. Proxy Services described here may, in examples, manage the life cycle of communication channels, or tunnels to ensure guaranteed access to hosted services and applications regardless of their location. Examples of proxy services may create one or more tunnels, each in accordance with a particular tunneling protocol. The tunneling protocol used may be selected in accordance with a request, including information parameters—in this manner, proxy services described herein may be quite flexible in supporting tunneling connections to multiple and variable types of services and tunneling protocols.

23 Claims, 6 Drawing Sheets

(56) References Cited

U.S. PATENT DOCUMENTS

| | | |
|---|---|---|
| 8,850,130 B1 | 9/2014 | Aron et al. |
| 8,863,124 B1 | 10/2014 | Aron |
| 9,009,106 B1 | 4/2015 | Aron et al. |
| 9,069,708 B2 | 6/2015 | Gill et al. |
| 9,210,534 B1 | 12/2015 | Matthieu et al. |
| 9,244,951 B2 | 1/2016 | Mandelstein et al. |
| 9,253,252 B2 | 2/2016 | Agarwal et al. |
| 9,336,132 B1 | 5/2016 | Aron et al. |
| 9,600,494 B2 | 3/2017 | Maluf et al. |
| 9,606,794 B1 | 3/2017 | Chou et al. |
| 9,633,197 B2 | 4/2017 | Lakshmanan et al. |
| 9,634,893 B2 | 4/2017 | Boutros et al. |
| 9,641,650 B2 | 5/2017 | Virkki et al. |
| 9,652,265 B1 | 5/2017 | Narayanasamy et al. |
| 9,684,502 B2 | 6/2017 | Fu et al. |
| 9,729,411 B2 | 8/2017 | Purusothaman |
| 9,736,194 B1 | 8/2017 | Rao et al. |
| 9,747,287 B1 | 8/2017 | Bhardwaj et al. |
| 9,772,866 B1 | 9/2017 | Aron et al. |
| 9,836,296 B2 | 12/2017 | Vandikas et al. |
| 9,860,677 B1 | 1/2018 | Agerstam et al. |
| 9,917,865 B2 | 3/2018 | Arora et al. |
| 9,977,415 B2 | 5/2018 | Zimmerman et al. |
| 10,091,270 B2 | 10/2018 | Fang |
| 10,149,154 B2 | 12/2018 | Zimmerman et al. |
| 10,156,842 B2 | 12/2018 | Wu et al. |
| 10,181,978 B1 | 1/2019 | Argenti |
| 10,225,335 B2 | 3/2019 | Fu et al. |
| 10,230,798 B2 | 3/2019 | Doraiswamy et al. |
| 10,262,019 B1 | 4/2019 | Reiner et al. |
| 10,291,714 B2 | 5/2019 | Mathews et al. |
| 10,306,513 B2 | 5/2019 | Bartfai-Walcott et al. |
| 10,489,138 B1 | 11/2019 | Wu et al. |
| 10,515,119 B2 | 12/2019 | Kirk et al. |
| 10,534,629 B1 | 1/2020 | St. Pierre et al. |
| 10,567,925 B2 | 2/2020 | Ly et al. |
| 10,652,226 B2 | 5/2020 | Islam et al. |
| 10,838,833 B1 | 11/2020 | Jibaja et al. |
| 10,893,116 B1 | 1/2021 | Koehler |
| 10,924,342 B2 | 2/2021 | Joshi et al. |
| 11,194,483 B1 | 12/2021 | Dontu et al. |
| 11,316,733 B1* | 4/2022 | Johnson .............. G06F 13/102 |
| 11,501,881 B2 | 11/2022 | Patil et al. |
| 2002/0143819 A1 | 10/2002 | Han et al. |
| 2004/0177359 A1* | 9/2004 | Bauch .............. H04L 67/101 |
| | | 719/313 |
| 2005/0060328 A1 | 3/2005 | Suhonen et al. |
| 2008/0270515 A1 | 10/2008 | Chen et al. |
| 2009/0204711 A1* | 8/2009 | Binyamin .............. G06F 3/0481 |
| | | 709/226 |
| 2009/0260004 A1 | 10/2009 | Datta et al. |
| 2010/0008510 A1 | 1/2010 | Zayas |
| 2010/0077473 A1 | 3/2010 | Takeshita et al. |
| 2010/0175061 A1 | 7/2010 | Maeda et al. |
| 2011/0153824 A1 | 6/2011 | Chikando et al. |
| 2011/0231899 A1 | 9/2011 | Pulier et al. |
| 2011/0251992 A1 | 10/2011 | Bethlehem et al. |
| 2011/0265077 A1 | 10/2011 | Collison et al. |
| 2012/0102486 A1 | 4/2012 | Yendluri |
| 2012/0265884 A1 | 10/2012 | Zhang et al. |
| 2012/0266156 A1 | 10/2012 | Spivak et al. |
| 2012/0281708 A1 | 11/2012 | Chauhan et al. |
| 2013/0219479 A1 | 8/2013 | Desoto et al. |
| 2013/0304903 A1 | 11/2013 | Mick et al. |
| 2013/0332916 A1 | 12/2013 | Chinn et al. |
| 2014/0074539 A1 | 3/2014 | Doering et al. |
| 2014/0075412 A1 | 3/2014 | Kannan et al. |
| 2014/0075431 A1 | 3/2014 | Kumar et al. |
| 2014/0164486 A1 | 6/2014 | Ravinchandran et al. |
| 2014/0279899 A1 | 9/2014 | Gu et al. |
| 2014/0317261 A1 | 10/2014 | Shatzkamer et al. |
| 2014/0330948 A1 | 11/2014 | Dunn et al. |
| 2014/0372508 A1 | 12/2014 | Fausak et al. |
| 2015/0057817 A1 | 2/2015 | Endrizzi et al. |
| 2015/0067030 A1 | 3/2015 | Smith et al. |
| 2015/0074106 A1* | 3/2015 | Ji .............. G06F 16/284 |
| | | 707/736 |
| 2015/0120893 A1 | 4/2015 | Sapaliga et al. |
| 2015/0261876 A1 | 9/2015 | Trikha et al. |
| 2015/0347542 A1 | 12/2015 | Sullivan et al. |
| 2016/0007138 A1 | 1/2016 | Palanisamy et al. |
| 2016/0092176 A1 | 3/2016 | Straub et al. |
| 2016/0092180 A1 | 3/2016 | Straub |
| 2016/0092348 A1 | 3/2016 | Straub et al. |
| 2016/0094398 A1 | 3/2016 | Choudhury et al. |
| 2016/0098265 A1 | 4/2016 | Mahajan et al. |
| 2016/0112268 A1 | 4/2016 | Chung et al. |
| 2016/0156614 A1 | 6/2016 | Jain et al. |
| 2016/0197830 A1 | 7/2016 | Ulevitch et al. |
| 2016/0202964 A1 | 7/2016 | Butcher et al. |
| 2016/0216959 A1 | 7/2016 | Kurian et al. |
| 2016/0315848 A1 | 10/2016 | Weinstein |
| 2016/0315912 A1 | 10/2016 | Mayya et al. |
| 2016/0323161 A1 | 11/2016 | Cuervo Laffaye et al. |
| 2016/0323361 A1 | 11/2016 | Austel et al. |
| 2016/0337104 A1 | 11/2016 | Kalligudd |
| 2016/0337175 A1* | 11/2016 | Rao .............. H04L 41/5051 |
| 2016/0342906 A1 | 11/2016 | Shaashua et al. |
| 2016/0344745 A1 | 11/2016 | Johnson et al. |
| 2016/0345516 A1 | 12/2016 | Britt et al. |
| 2016/0357525 A1 | 12/2016 | Wee et al. |
| 2017/0005820 A1 | 1/2017 | Zimmerman et al. |
| 2017/0006135 A1 | 1/2017 | Siebel et al. |
| 2017/0048079 A1 | 2/2017 | Nethi et al. |
| 2017/0060574 A1 | 3/2017 | Malladi et al. |
| 2017/0099176 A1 | 4/2017 | Jain |
| 2017/0102931 A1 | 4/2017 | Risbood et al. |
| 2017/0123939 A1 | 5/2017 | Maheshwari et al. |
| 2017/0126809 A1 | 5/2017 | Chen et al. |
| 2017/0142068 A1 | 5/2017 | Devarajan et al. |
| 2017/0149931 A1 | 5/2017 | Lochhead et al. |
| 2017/0168813 A1 | 6/2017 | Pogrebinsky et al. |
| 2017/0171607 A1 | 6/2017 | Britt |
| 2017/0177334 A1 | 6/2017 | Chou et al. |
| 2017/0177877 A1 | 6/2017 | Suarez et al. |
| 2017/0180346 A1 | 6/2017 | Suarez et al. |
| 2017/0185507 A1* | 6/2017 | Eberlein .............. G06F 8/60 |
| 2017/0185922 A1 | 6/2017 | Lange et al. |
| 2017/0187807 A1 | 6/2017 | Clernon |
| 2017/0201585 A1 | 7/2017 | Doraiswamy et al. |
| 2017/0244600 A1 | 8/2017 | Hussein et al. |
| 2017/0257432 A1 | 9/2017 | Fu et al. |
| 2017/0289173 A1 | 10/2017 | Resch et al. |
| 2017/0315820 A1 | 11/2017 | Entezari et al. |
| 2017/0347264 A1 | 11/2017 | Holland et al. |
| 2018/0007055 A1 | 1/2018 | Infante-Lopez et al. |
| 2018/0013819 A1 | 1/2018 | Li |
| 2018/0034914 A1 | 2/2018 | Christopher et al. |
| 2018/0054315 A1 | 2/2018 | Liu et al. |
| 2018/0054490 A1 | 2/2018 | Wadhwa et al. |
| 2018/0067830 A1 | 3/2018 | Jagtiani et al. |
| 2018/0092151 A1 | 3/2018 | Liu et al. |
| 2018/0101415 A1 | 4/2018 | Mahindru et al. |
| 2018/0109395 A1 | 4/2018 | Berdy et al. |
| 2018/0109650 A1 | 4/2018 | Berdy et al. |
| 2018/0109929 A1 | 4/2018 | Ly et al. |
| 2018/0123820 A1 | 5/2018 | Kim |
| 2018/0159745 A1 | 6/2018 | Byers et al. |
| 2018/0167392 A1 | 6/2018 | Zakaria |
| 2018/0212970 A1 | 7/2018 | Chen et al. |
| 2018/0219877 A1 | 8/2018 | Hsu et al. |
| 2018/0234351 A1 | 8/2018 | Amento et al. |
| 2018/0293463 A1 | 10/2018 | Brown |
| 2018/0295194 A1 | 10/2018 | Deraz et al. |
| 2018/0300124 A1 | 10/2018 | Malladi et al. |
| 2018/0302266 A1 | 10/2018 | Makovsky et al. |
| 2018/0307464 A1 | 10/2018 | Bijani et al. |
| 2018/0307537 A1 | 10/2018 | Chen et al. |
| 2018/0309819 A1 | 10/2018 | Thompson |
| 2018/0314808 A1 | 11/2018 | Casey et al. |
| 2018/0324204 A1 | 11/2018 | McClory et al. |
| 2018/0332116 A1 | 11/2018 | George et al. |
| 2018/0338242 A1 | 11/2018 | Li et al. |
| 2018/0373419 A1 | 12/2018 | Chen et al. |

(56) References Cited

U.S. PATENT DOCUMENTS

| | | | |
|---|---|---|---|
| 2018/0373555 A1 | 12/2018 | Gupta et al. | |
| 2019/0014048 A1 | 1/2019 | Krishna Singuru | |
| 2019/0018951 A1 | 1/2019 | James et al. | |
| 2019/0026082 A1 | 1/2019 | Shalev et al. | |
| 2019/0041824 A1 | 2/2019 | Chavez et al. | |
| 2019/0045033 A1 | 2/2019 | Agerstam et al. | |
| 2019/0068445 A1 | 2/2019 | Chauhan et al. | |
| 2019/0087220 A1 | 3/2019 | Turner | |
| 2019/0098113 A1 | 3/2019 | Park et al. | |
| 2019/0109816 A1 | 4/2019 | Liu et al. | |
| 2019/0121889 A1 | 4/2019 | Gold et al. | |
| 2019/0123959 A1 | 4/2019 | Joshi et al. | |
| 2019/0141022 A1* | 5/2019 | Reeve | H04L 63/102 |
| 2019/0146773 A1 | 5/2019 | Attard | |
| 2019/0158353 A1 | 5/2019 | Johnson et al. | |
| 2019/0158600 A1 | 5/2019 | Cook | |
| 2019/0182333 A1 | 6/2019 | Bartfai-Walcott et al. | |
| 2019/0188742 A1 | 6/2019 | Vasudevan et al. | |
| 2019/0190776 A1 | 6/2019 | Bregman et al. | |
| 2019/0213273 A1 | 7/2019 | Vasudevan et al. | |
| 2019/0251166 A1 | 8/2019 | Penrose et al. | |
| 2019/0286353 A1 | 9/2019 | Soni et al. | |
| 2019/0295012 A1 | 9/2019 | Marinescu et al. | |
| 2019/0319919 A1 | 10/2019 | Knecht et al. | |
| 2019/0320038 A1 | 10/2019 | Walsh et al. | |
| 2019/0342182 A1 | 11/2019 | Dhanabalan et al. | |
| 2020/0014607 A1 | 1/2020 | Gangaadhar et al. | |
| 2020/0014633 A1 | 1/2020 | You et al. | |
| 2020/0034776 A1 | 1/2020 | Peran et al. | |
| 2020/0073739 A1 | 3/2020 | Rungta et al. | |
| 2020/0092789 A1 | 3/2020 | Lee et al. | |
| 2020/0097274 A1 | 3/2020 | Sarkar et al. | |
| 2020/0104723 A1 | 4/2020 | Reissner et al. | |
| 2020/0112487 A1 | 4/2020 | Inamdar et al. | |
| 2020/0122038 A1 | 4/2020 | Ebrahimi et al. | |
| 2020/0127832 A1 | 4/2020 | Ebrahimi | |
| 2020/0177503 A1 | 6/2020 | Hooda et al. | |
| 2020/0177630 A1* | 6/2020 | Penner | H04L 63/166 |
| 2020/0218580 A1 | 7/2020 | Kim | |
| 2020/0258627 A1 | 8/2020 | Setegn et al. | |
| 2020/0274776 A1 | 8/2020 | Nishikawa | |
| 2020/0287737 A1* | 9/2020 | Mishra | H04L 12/1886 |
| 2020/0336467 A1 | 10/2020 | Subbarayan et al. | |
| 2020/0356415 A1 | 11/2020 | Goli | |
| 2021/0004270 A1 | 1/2021 | Singh et al. | |
| 2021/0005330 A1 | 1/2021 | Patil et al. | |
| 2021/0006636 A1 | 1/2021 | Koehler et al. | |
| 2021/0042104 A1* | 2/2021 | Tashkandi | G06F 8/77 |
| 2021/0042160 A1 | 2/2021 | Alamouti et al. | |
| 2021/0044579 A1 | 2/2021 | Nelson-Gal et al. | |
| 2021/0067607 A1 | 3/2021 | Gardner et al. | |
| 2021/0084670 A1 | 3/2021 | Chauhan et al. | |
| 2021/0089408 A1 | 3/2021 | Park et al. | |
| 2021/0112059 A1* | 4/2021 | Heldman | H04L 67/02 |
| 2021/0112128 A1 | 4/2021 | Joshi et al. | |
| 2021/0140815 A1 | 5/2021 | Pretorius et al. | |
| 2021/0160338 A1 | 5/2021 | Koehler et al. | |
| 2021/0255846 A1 | 8/2021 | Mamgain et al. | |
| 2021/0311764 A1 | 10/2021 | Rosoff et al. | |
| 2021/0342193 A1 | 11/2021 | Anand | |
| 2021/0373965 A1 | 12/2021 | Hadas et al. | |
| 2021/0400043 A1 | 12/2021 | Su et al. | |
| 2022/0083389 A1 | 3/2022 | Poothia et al. | |
| 2022/0121543 A1 | 4/2022 | Poothia et al. | |
| 2022/0138070 A1 | 5/2022 | Mokashi et al. | |
| 2022/0147336 A1 | 5/2022 | Joshi et al. | |
| 2022/0159093 A1 | 5/2022 | Joshi et al. | |

FOREIGN PATENT DOCUMENTS

| | | |
|---|---|---|
| EP | 2831746 A1 | 2/2015 |
| WO | 9945465 A1 | 9/1999 |
| WO | 2014007811 A1 | 1/2014 |
| WO | 2020096639 A1 | 5/2020 |

OTHER PUBLICATIONS

Jared Rosoff, Project Pacific—Technical Overview, VMWare VSphere Blog, pp. 1-14, Aug. 2019 (Year: 2019).*
VMware, Meeting at the Edge with VMware Internet of Things (IoT), pp. 1-9, Apr. 2017 (Year: 2017).*
Pivotal Software, Pivotal Container Service (PKS), pp. 1-323, Sep. 2019 (Year: 2019).*
VMware, Unified Access Gateway Architecture, pp. 1-22, Nov. 2020 (Year: 2020).*
Rohini Rajaram, Pivotal Container Service Overview, pp. 1-52, Jul. 2019 (Year: 2019).*
Ronak Banka, PCF and GCP for success, pp. 1-33, 2017 (Year: 2017).*
Amam Malasi, Google Anthos: Write Once, Run Anywhere, pp. 1-2, Aug. 2019 (Year: 2019).*
U.S. Appl. No. 16/522,567, titled "Apparatus and Method for Deploying a Machine Learning Inference as a Service At Edge Systems", dated Jul. 25, 2019; pp. all pages of application as filed.
U.S. Appl. No. 16/666,242, titled "Scalable Centralized Internet-Ofthings Manager", dated Oct. 28, 2019; pp. all pages of application as filed.
U.S. Appl. No. 16/920,235, titled "Apparatus and Method for Deploying a Mobile Device as a Data Source in an IOT System", dated Jul. 2, 2020; pp. all pages of application as filed.
U.S. Appl. No. 16/526,816 titled "Serverless Data Pipelines for Edge Computing" filed Jul. 30, 2019; pp. all pages of application as filed.
U.S. Appl. No. 16/945,306, titled "Platform-As-A-Service Deployment Including Service Domains", dated Jul. 31, 2020; pp. all pages of application as filed.
U.S. Appl. No. 17/141,870 titled "Apparatuses and Methods for Edge Computing Application Deployment in an IOT System" filed Jan. 5, 2021; pp. all pages of application as filed.
Warburton, Tim, "An Intro to GPU Architecture and Programming Models I Tim Warburton, Virginia Tech", YouTube, Argonne National Laboratory Training, https7/www.youtube.com/watch?v=IGmPy8xpT4E, Sep. 25, 2017, pp. 1-3.
U.S. Appl. No. 17/139,325 titled "Key Value Store in a Clustered Containerized System" filed Dec. 31, 2020; pp. all pages of application as filed.
U.S. Appl. No. 17/148,231 titled "Upgrade Systems for Service Domains" filed Jan. 13, 2021 pp. all pages of application as filed.
U.S. Appl. No. 17/302,189 titled "User Interface and Health Status Monitoring for a Multi Service Domainsystem" filed Apr. 27, 2021; pp. all pages of application as filed.
U.S. Appl. No. 17/350,636 titled "Al Inference Hardware Resource Scheduling" filed Jun. 17, 2021; pp. all pages of application as filed.
U.S. Appl. No. 17/376,581 titled "Common Services Model for Multi-Cloud Platform" filed Jul. 15, 2021; pp. all pages of application as filed.
U.S. Appl. No. 16/522,567 titled "Machine Inference as a Service" filed Jul. 25, 2019; pp. all pages of application as filed.
"BtrPlace: An Open-Source Flexible Virtual Machine Scheduler", University Nice Sophia Antipolis, captured Aug. 1, 2020, pp. 1-8.
"From Pilot to Production: Secure Workspace loT Endpoint Management at Scale", VMWare, Inc. ittps://www vmware com/products/workspace-one/workspace-iot html, pp. 1-3.
"Multi-Process Service", Nvidia, vR450, https://docs.nvidia.com/deploy/pdf/CUDA_Multi_Process_Service_Overview.pdf, Jun. 2020, pp. 1-28.
"TensorFlow Serving", GitHub, https://github.com/tensorflow/serving, captured Aug. 1, 2020; pp. 1-4.
Abadi, Martin, et al., "TensorFlow: Large-Scale Machine Learning on Heterogeneous Distributed Systems", Preliminary White Paper, http://download.tensorflow.org/paper/whitepaper2015.pdf, Nov. 9, 2015, pp. 1-19.
Beguelin, Daniel, "Turn Your Smartphone Into an loT Device", IBM Developer fhttps://developer.ibm.com/tutorials/iot-mobile-phone-iot-device-bluemix-apps-trs/, Nov. 10, 2015, pp. 1-12.
Goldsborough, Peter, et al., "A Tour of TensorFlow: Proseminar Data Mining", Technische Universität München, https://arxiv.org/pdf/1610.01178.pdf, Oct. 2016, pp. 1-16.

(56) References Cited

OTHER PUBLICATIONS

Grammatikou, Mary, et al., "GEMBus As a Service Oriented Platform for Cloud-Based Composable Services", 2011 IEEE Third International Conference on Cloud Computing Technology and Science, Nov. 1, 2011, pp. 666-671.

Hermann, Jeremy, et al., "Meet Michelangelo: Uber's Machine Learning Platform", Uber Engineering, https://eng.uber.com/michelangelo-machine-learning-platform/, Sep. 5, 2017, pp. 1-17.

Hoare, Suchismita, et al., "A Semantic-Agent Framework For PaaS INTEROPERABILITY", 2016 International IEEE Conferences on Ubiquitous Intelligence & Computing, Advanced and Trusted Computing, Scalable Computing and Communications, Cloud and Big Data Computing, Internet of People, and Smart World Congress, Jul. 18, 2016, pp. 788-793.

Jain, Paras, et al., "Dynamic Space-Time Scheduling for GPU Inference", Massachusetts Institute of Technology, University of California, Berkeley; http://learningsys.org/nips18/assets/papers/102CameraReadySubmissionGPU_Virtualization%20(8).pdf, Dec. 31, 2018, pp. 1-8.

Khaddar, Ajana El Mehdia, et al., "Smartphone: the Ultimate IoT and IoE Device", IntechOpen, "Smartphones from an Applied Research Perspective", pp. 137-162 (Ch. 7), Nov. 2, 2017, http://dx.doi.org/10.5772/intecho pen.69734.

Li, Li Erran, et al., "Scaling Machine Learning as a Service", Uber Technologies, Inc., JMLR: Workshop and Conference Proceeding, http://proceedings.mlr.press/v67/li17a/li17a.pdf, Jun. 19-24, 2016, pp. 16-29.

Mahajan, Kshiteej, et al., "Themis: Fair and Efficient GPU Cluster Scheduling", Cornell University, ARXIV:1907.01484 [CS.DC], Published Oct. 29, 2019, 15 pages.

Mijumbi, Rashid, et al., "Learning Algorithms for Dynamic Resource Allocation in Virtualised Networks", Universitat Polit'ecnica de Catalunya, 08034 Barcelona, Spain, Publication date unknown, 4 pages.

Rafique, Ansar, et al., "Towards Portability and Interoperability Support in Middleware for Hybrid Clouds", 2014 IEEE INFOCOM Workshop on Cross-Cloud Systems, Apr. 27, 2014, pp. 7-12.

Stoks, Jessie, "Workspace IoT Series: How Industry 4.0 Will Transform Your Mobile Strategy", VMware End-User Computing Blog https://blogs.vmware.com/euc/2019/02/workspace-iot-mobile-strategy.html, Feb. 20, 2019, pp. 1-5.

Sun, Peng, et al., "Towards Distributed Machine Learning in Shared Clusters: a Dynamically-Partitioned Approach", Cornell University: ARXIV: 1704.06738V1 [CS.CD], Published Apr. 22, 2017, 6 pages.

"Anthos", Google Cloud, https://cloud.google.com/anthos, Apr. 21, 2020, pp. 1-26.

"Architecting For The Cloud: AWS Best Practice", Amazon Web Services, https://d1.awsstatic.com/whitepapers/AWS_Cloud_Best_Practices.pdf, Oct. 2018, pp. 1-50.

"Best Practices for Cloud Management", Service Now, https://www.servicenow.com/content/dam/servicenow-assets/public/en-us/doc-type/resource-center/solution-brief/sb-cloud-management.pdf, Jun. 2017, pp. 1-2.

"IoT at the Edge: Bringing intelligence to the edge using Cloud IoT (Cloud Next '18)", YouTube; Google Cloud Tech https://www.youtube.com/watch?v=-T9MNR-BI8I, Aug. 17, 2018, pp. 1.

"mPRM: An Overview", ProSyst, http://documentation.bosch-si.eom/iot/PRM/v6.0/welcome/mprm_functional.html, Jun. 13, 2017, pp. 1-3.

"Multicloud Application Patterns", VMWare Docs, https://docs.vmware.com/en/VMware-Tanzu-Service-Mesh/services/concepts-guide/GUID-4123C2ED-EC61-4CDA-A38D-2A7454BDDA46.html, Jul. 7, 2020, pp. 1-2.

"Setting up ServiceNow Cloud Management", DxSherpa, https://dxsherpa.com/blogs/setting-up-servicenow-cloud-management/, Jul. 19, 2018, pp. 1-10.

"Welcome to Azure Arc", YouTube, Microsoft Azure, https://www.youtube.com/watch?v=3zdJJ97pNT4, Feb. 19, 2020, pp. 1.

Carey, Scott, "The major hybrid cloud options compared: AWS Outposts vs Azure Stack vs Google Anthos", ComputerWorld, https://www.computerworld.com/article/3428108/the-major-hybrid-cloud-options-compared-aws-3utposts-vs-azure-stack-vs-google-anthos.html, Nov. 6, 2019, pp. 1-9.

Holzle, Urs, et al., "Introducing Anthos: An entirely new platform for managing applications in today's multi-cloud world", Google Cloud Blog, https://cloud.google.com/blog/topics/hybrid-cloud/new-platform-for-managing-applications-in-todays-multi-cloud-world, Apr. 9, 2019, pp. 1-6.

Lewis, Sarah, "Cloudify", TechTarget, https://www.techtarget.com/searchcloudcomputing/definition/Cloudify, Jun. 2019, pp. 1.

Marko, Kurt, "SAP to the fore as Cloud Foundry grows into the preferred platform for cloud-native enterprise apps", Diginomica, https://diginomica.com/cloud-foundry-growing-preferred-platform-cloud-native-enterprise-applications, Jun. 19, 2017, pp. 1-10.

Mohamed, Riaz, "Deploy Cloud Agnostic Applications with VMware vRealize Automation Cloud", VMWare Cloud Management, https://blogs.vmware.com/management/2019/09/cloud-agnostic-apps-vra-cloud.html, Sep. 17, 2019, pp. 1-10.

Morabito, Roberto, et al., "A Framework Based on SDN and Containers for Dynamic Service Chains on IoT Gateways", Proceedings of the Workshop on Hot Topics in Container Networking and Networked Systems. Ericsson Research, NomadicLab, Aug. 11, 2017, pp. 42-47.

MSV, Janakiram, "Google Forays Into Edge Computing With Cloud IoT Edge and TPU", Forbes https://www.forbes.com/sites/janakirammsv/2018/07/30/google-forays-into-edge-computing-through-cloud-iot-edge-and-tpu/?sh=5e68b3fc6005, Jul. 30, 2018, pp. 1-4.

MSV, Janakiram, "Why Azure Arc Is A Game Changer For Microsoft", Forbes https://www.forbes.com/sites/janakirammsv/2019/11/05/why-azure-arc-is-a-game-changer-for-microsoft/?sh=373f5c854307, Nov. 5, 2019, pp. 1-10.

Nolle, Tom, "Guide to Google Anthos architecture and management", TechTarget, https://www.techtarget.com/searchcloudcomputing/tip/Guide-to-Google-Anthos-architecture-and-management, Aug. 27, 2020, pp. 1-7.

Stakun, Jaroslaw, "Introduction to Red Hat OpenShift Container Platform", Open Virtualization Pro https://www.openvirtualization.pro/red-hat-openshift-container-platform/, Apr. 26, 2019, pp. 1.

Wiggers, Steef-Jan, "Google Cloud Platform Release Edge TPU and Cloud IoT Edge", InfoQ https://www.infoq.com/news/2018/07/google-iot-edge-tpu-ai/, Jul. 30, 2018, pp. 1-4.

Cano, Ignacio et al. "Curator: Self-Managing Storage for Enterprise Clusters"; University of Washington; published Mar. 2017; pp. all.

Poitras, Steven. "The Nutanix Bible" (Sep. 1, 2020), from https://nutanixbible.com/ pp. all.

Poitras, Steven. "The Nutanix Bible" (Sep. 17, 2019), from https://nutanixbibe.com/ pp. all.

Poitras, Steven. "The Nutanix Bible" (Jul. 25, 2019). from https://nutanixbible.com/ pp. all.

Lacoste, M. et al., "User-Centric Security And Dependability In The Clouds-of-Clouds", IEEE Cloud Computing, Sep. 2016, pp. 64-75.

Poitras, Steven. "The Nutanix Bible" (Mar. 2, 2020), from https://nutanixbible.com/ pp. all.

Poitras, Steven. "The Nutanix Bible" (Jan. 11, 2014), from http://sievenpoitras.com/the-nutanix-bibie/ (Publication date based on indicated capture date by Archive.org; first publication date unknown), pp. all.

Poitras, Steven. "The Nutanix Bible" (Jan. 12, 2016), from https://nutanixbible.com/ pp. all.

Poitras, Steven. "The Nutanix Bible" (Oct. 15, 2013), from http://stevenpoitras.com/the-nutanix-bible/ (Publication date based on indicated capture date by Archive.org; first publication date unknown), pp. all.

Poitras, Steven. "The Nutanix Bible" (Jun. 20, 2014), from http://stevenpoitras.com/the-nutanix-bible/ (Publication date based on indicated capture date by Archive.org; first publication date unknown), pp. all.

Poitras, Steven. "The Nutanix Bible" (Jun. 25, 2018), from https://nutanixbible.com/ pp. all.

(56) References Cited

OTHER PUBLICATIONS

Poitras, Steven. "The Nutanix Bible" (Jan. 3, 2017), from https://nutanixbible.com/ pp. all.
Poitras, Steven. "The Nutanix Bible" (Jan. 3, 2018), from https://nutanixbible.com/ pp. all.
Poitras, Steven. "The Nutanix Bible" (Sep. 4, 2015), from https://nutanixbible.com/ pp. all.
Poitras, Steven. "The Nutanix Bible" (Jan. 7, 2015), from http://stevenpoitras.com/the-rmtanix-bible/ (Publication date based on indicated capture date by Archive.org; first publication date unknown), pp. all.
Poitras, Steven. "The Nutanix Bible" (Jan. 8, 2019), from https://nutanixbible.com/ pp. all.
Poitras, Steven. "The Nutanix Bible" (Jun. 8, 2017), from https://nutanixbible.com/, pp. all.
Poitras, Steven. "The Nutanix Bible" (Jun. 9, 2015), from http://stevenportras.com/the-nutanix-bible/ (Publication date based on indicated capture date by Archive.org; first publication date unknown), pp. all.
Poitras, Steven. "The Nutanix Bible" (Jun. 9, 2016), from https://nutanixbible.com/ pp. all.
"AWS Architecture Monthly—Internet of Things Jun. 2019", AWS | https://d1.awsstatic.com/whitepapers/architecture-monthly/AWS-Architecture-Monthly-June-2019.pdf, Jun. 2019.
"AWS IoT Greengrass", https://web.archive.org/web/20190624094650/https://aws.amazon.com/greengrass/, Jun. 2019, pp. 1-13.
"AWS IoT vs. Google IoT vs. Azure IoT", Bizety | https://www.bizety.com/2018/08/28/aws-iot-vs-google-iot-vs-azure-ot/, Aug. 28, 2018, pp. 1-7.
"Azure IoT Central intro walkthrough", https://www.youtube.com/watch?v=G32stXSwtyA&ab_channel=MicrosoftDeveloper, Feb. 2018.
"Cloud IOT Core", https://web.archive.org/web/20190129000453/https7cloud.google.com/iot-core/, Jan. 2019, pp. 1-10.
"Cloud IoT Core—Devices, configuration, and state", Google | https://web.archive.org/web/20190330153113/https://cloud.google.com/iot/docs/concepts/devices, Mar. 2019.
"Cloud IOT Core Private Beta", Google | https://web.archive.org/web/20170518022234/https://cloud.google.com/iot-core/, May 2017.
"Comprehensive Guide on Upgrading PKS", PKS 1.3 https://kb.vmware.com/sfc/servlet.shepherd/version/download/068f4000009EfWPAA0, Apr. 2019, pp. 1-45.
"Deploying and Configuring VMware Unified Access Gateway", VMware | Unified Access Gateway 3.1 https://techzone.vmware.com/configuring-edge-services-vmware-unified-access-gateway-vmware-workspace-one-operational-tutorial#overview, Oct. 27, 2017, pp. 1-89.
"Extended offline operation with Azure IoTEdge", Microsoft | https://azure.microsoft.com/en-us/blog/extended-offline-operation-with-azure-iot-edge/, Sep. 2018.
"Extract, Transform, Load with AWS IoT Greengrass Solution Accelerator", AWS | https://aws.amazon.com/iot/solutions/etl-accelerator/, Oct. 2019, pp. 1-6.
"Google Cloud IoT Core", Google | https://www.slideshare.net/idof/google-cloud-iot-core, Sep. 2018.
"Introducing Google Cloud IoT Core: forsecurely connecting and managing IoTdevices at scale", Google Cloud https://cloud.google.com/blog/products/gcp/introducing-google-cloud-iot-core-for-securely-connecting-and-managing-iot-devices-at-scale, May 2017.
"IoT Core device-to-device communication", Google |https://cloud.google.com/community/tutorials/iot-device-to-device, Dec. 2017.
"IoT Partner Quickstart", https://services.google.com/fh/files/misc/iot_partner_quickstart1.0.pdf, Nov. 15, 2018, pp. 1-13.
"Microsoft Azure IoT Reference Architecture", Version 2.0 Release, May 2, 2018, pp. 1-79.
"Microsoft IoT Central delivers low-code wayto build IoT solutions fast", Microsoft | https://azure.microsoft.com/en-us/blog/microsoft-iot-central-delivers-low-code-way-to-build-iot-solutions-fast/, Dec. 2017.
"Mobile Content Management", VMWare | https://www.vmware.com/content/dam/digitalmarketing/vmware/en/pdf/workspace-one/vmware-airwatch-mcm-datasheet.pdf, Dec. 2019, pp. 1-4.
"Neo-AI-DLR is a common runtime for machine learning models compiled by AWS SageMaker Neo, TVM, or TreeLite.", GitHub | https://github.com/neo-ai/neo-ai-dlr, Dec. 1, 2020, pp. 1-4.
"Release Notes for VMware Unified Access Gateway 3.1 and 3.1.1", https://docs.vmware.com/en/Unified-Access-Gateway/3.1/rn/unified_access_gateway-31-release-notes.html, Oct. 27, 2017, pp. 1-4.
"TensorFlow Lite Delegates", TensorFlow | https://www.tensorflow.org/lite/performance/delegates, Jan. 30, 2021, pp. 1-8.
"VMware Charts Course for Customers to Seize Opportunity at the Edge", VMWare News & Stories | https://news.vmware.com/releases/vmworld-2021-edge, Oct. 5, 2021, pp. 1-11.
"What is AWS IoT?", AWS | Youtube: https://www.youtube.com/watch?v=WAp6FHbhYCk&ab_channel=AmazonWebServices: Timestamp 4:55/10:08, Jan. 2018.
"What is IoT Edge?", Code Project | https://www.codeproject.com/Articles/1261285/What-is-IoT-Edge, Sep. 2018, pp. 1-9.
Avram, Abel , "AWS Greengrass Runs Lambda Functions on IoT Devices", InfoQ | https://www.infoq.com/news/2017/06/aws-greengrass/, Jun. 8, 2017, pp. 1-2.
Chi, Chrissie , "Enabling more device management scenarios with new features in IoT Hub", Microsoft Azure | https://azure.microsoft.com/en-us/blog/enabling-more-device-management-scenarios-with-new-features-in-iot-hub/, May 7, 2018, pp. 1-6.
Lobo, Savia , "Microsoft Azure IoT Edge is open source and generally available!", PacktHub | https://hub.packtpub.com/microsoft-azure-iot-edge-is-open-source-and-generally-available/, Jun. 29, 2018, pp. 1-2.
MSV, Janakiram , "5 Reasons Why Azure IoT Edge Is Industry's Most Promising Edge Computing Platform", Forbes https://www.forbes.com/sites/janakirammsv/2018/07/01/5-reasons-why-azure-iot-edge-is-industrys-most-promising-edge-computing-platform/?sh=56b9ef223249, Jul. 2, 2018, pp. 1-5.
MSV, Janakiram , "Azure IoT Edge: A Technology Primer", TheNewsStack | https://thenewstack.io/azure-iot-edge-a-technology-primer/, Sep. 14, 2018, pp. 1-9.
Oleniczak, Kevin , "Using AWS IoT for Predictive Maintenance", AWS | https://aws.amazon.com/blogs/iot/using-aws-iot-for-predictive-maintenance/, Jun. 28, 2018, pp. 1-6.
Rhee, Injong , "Bringing intelligence to the edge with Cloud IoT", Google Cloud | https://cloud.google.com/blog/products/gcp/bringing-intelligence-edge-cloud-iot, Jul. 25, 2018, pp. 1-7.
Vanderzyden, John , "Using AWS Greengrass to Enable IoT Edge Computing", mabl | https://www.mabl.com/blog/using-aws-greengrass-enable-iot-edge-computing, Aug. 23, 2017, pp. 1-12.
Wiggers, Kyle , "Microsoft launches Azure IoT Edge out of preview", VentureBeat | https://venturebeat.com/mobile/microsoft-launches-azure-iot-edge-out-of-preview/, Jun. 27, 2018, pp. 1-6.
Yamashita, Teppei, "Real-time data processing with IoT Core", Google Cloud | https://cloud.google.com/community/tutorials/cloud-iot-rtdp, Apr. 2018, pp. 1-19.
Zhang, Xinyi, "Create a CI/CD pipeline for your IoT Edge solution with Azure DevOps", Microsoft | https://devblogs.microsoft.com/iotdev/create-a-ci-cd-pipeline-for-your-iot-edge-solution-with-azure-devops/, Oct. 29, 2018, pp. 1-10.
Iyengar, Ashok , et al., "Clusters at the Edge", IBM https://www.ibm.com/cloud/blog/clusters-at-the-edge, Dec. 9, 2020, pp. 1-13.
Lin, Jennifer, et al., "Anthos simplifies application modernization with managed service mesh and serverless for your hybrid cloud", Google Cloud https://cloud.google.com/blog/topics/hybrid-cloud/anthos-simplifies-application-modernization-with-managed-service-mesh-and-serverless-for-your-hybrid-cloud, Sep. 16, 2019, pp. 1-6.
Manicka, Naveen , et al., "Simplify IoT Edge-to-Multi-Cloud Data Flow with Cisco Edge Intelligence", Cisco | Cisco Blogs https://blogs.cisco.com/developer/edge-intelligence-sandbox-lab, Aug. 6, 2020, pp. 1-7.
McLuckie, Craig , "Introducing VMware Tanzu Mission Control to Bring Order to Cluster Chaos", VMware Tanzu https://tanzu.vmware.com/content/blog/introducing-vmware-tanzu-mission-control-to-bring-order-to-cluster-chaos, Aug. 26, 2019, pp. 1-6.

(56) References Cited

OTHER PUBLICATIONS

O'keefe, Megan, "Welcome to the service mesh era: Introducing a new Istio blog post series", Google Cloud https://cloud.google.com/blog/products/networking/welcome-to-the-service-mesh-era-introducing-a-new-istio-blog-post-series, Jan. 22, 2019, pp. 1-5.
Poccia, Danilo, "New—AWS IoT Greengrass Adds Container Support and Management of Data Streams at the Edge", AWS | AWS News Blog https://aws.amazon.com/blogs/aws/new-aws-iot-greengrass-adds-docker-support-and-streams-management-at-the-edge/, Nov. 25, 2019, pp. 1-7.
Reid, Nate, "Upgrading VMware Enterprise PKS 1.2 to 1.3", YouTube https://www.youtube.com/watch?v=7pAxNWIxVLM, Jan. 28, 2019, pp. 1.
Schonbaum, Iftach, "Anthos—Google's Enterprise Hybrid & Multi-Cloud Platform", CloudZone https://medium.com/cloudzone/anthos-googles-enterprise-hybrid-multi-cloud-platform-7975e05a7729, Apr. 23, 2019, pp. 1-7.
Shalom, Nati, "Simplifying Hybrid Cloud Deployments With AWS EKS and Outpost", Cloudify https://cloudify.co/blog/simplifying-hybrid-cloud-deployments-with-aws-eks-and-outpost/, Feb. 24, 2021, pp. 1-13.
"Available Supporting Components", https://docs.openshift.com/container-platform/4.1/architecture/understanding-development.html#supporting-components retrieved May 27, 2022 relevant to OpenShift Container Platform 4.1 general availability Jun. 4, 2019, pp. 1-2.
"Comprehensive Guide on Upgrading PKS", PKS 1.3, Apr. 2019, pp. 1-45.
"Enabling Monitoring for User-defined Projects", https://docs.openshift.com/container-platform/4.6/monitoring/enabling-monitoring-for-user-defined-projects.html retrieved May 24, 2022 relevant to OpenShift Container Platform 4.6 general avaibility Oct. 27, 2020, pp. 1-13.
"How to adopt a multi-cluster strategy for your applications in Anthos", YouTube | Google Cloud Tech https://www.youtube.com/watch?v=ZhF-rTXq-Us&list=PLlivdWyY5sqKN73vzKpg2p2JmOGoAN0CG&index=6, May 29, 2020, pp. 1.
"How to get started with Anthos on Google Cloud", YouTube | Google Cloud Tech https://www.youtube.com/watch?v=ghFiaz7juoA&list=PLlivdWyY5sqKN73vzKpg2p2JmOGoAN0CG&index=4, Apr. 30, 2020, pp. 1.
"How to Troubleshoot PKS Upgrade Issues", VMware Tanzu Supprt Hub https://community.pivotal.io/s/article/how-to-troubleshoot-pks-upgrade-issues?language=en US, Jul. 17, 2019, pp. 1-11.
"Hybrid Cloud with AWS", AWS https://d1.awsstatic.com/whitepapers/hybrid-cloud-with-aws.pdf, Nov. 2020, pp. 1-20.
"Journey to OpenShift in a Multi-Cloud Environment, Part 3", RedHat Hybrid Cloud | Blog https://cloud.redhat.com/blog/journey-openshift-multi-cloud-environment-part-3, Jan. 2, 2018, pp. 1-4.
"Managing Metrics", https://docs.openshift.com/container-platform/4.6/monitoring/managing-metrics.html#managing-metrics retrieved May 24, 2022 relevant to OpenShift Container Platform 4.6 general availability Oct. 27, 2020, pp. 1-14.
"Migrating Kubernetes apps to Serverless with Cloud Run on Anthos", YouTube | Google Cloud Tech https://www.youtube.com/watch?v=0T5UliS9j8A, Nov. 19, 2019, pp.
"Monitoring Project and Application Metrics Using the Developer Perspective", https://docs.openshift.com/container-platform/4.9/applications/odc-monitoring-project-and-application-metrics-using-developer-perspective.html#monitoring-project-and-application-metrics-using-developer-perspective retrieved May 24, 2022 relevant to, OpenShift 4.9 general availability Oct. 18, 2020, pp. 1-7.
"New Technology Projection: The Total Economic Impact Of Anthos", A Forrester Total Economic Impact https://services.google.com/fh/files/misc/the_total_economic_impact_of_anthos. pdf?mkt_tok=ODA4LUdKVy0zMTQAAAGEowKcUaDaTyTRyP0murezYOwrjB4GihzmPwbs7d0qMaMhJZtax3Of12Gx2-HRDm4SifQME2gL7297yUgZ3FEMxg5UdUp3eFaN5j_Oie7D0ta28s, Nov. 2019, pp. 1-26.

"Observing Environments", https://access.redhat.com/documentation/en-us/red_hat_advanced_cluster_management_for_kubernetes/2.1/html-single/observing_environments/index retrieved May 24, 2022 relevant to Red Hat Advanced Cluster Management for Kubernetes 2.1, general availability Nov. 5, 2020, pp. 1-16.
"OpenShift Container Platform Architecture", https://docs.openshift.com/container-platform/4.1/architecture/architecture.html retrieved May 27, 2022 relevant to OpenShift Container Platform 4.1 general availability Jun. 4, 2019, pp. 1-11.
"OpenShift Container Platform cluster monitoring, logging, and Telemetry", RedHat https://access.redhat.com/documentation/en-us/openshift_container_platform/42/html/container-native_virtualization/container-native-virtualization-user-s-guide#cnv-openshift-cluster-monitoring, Oct. 16, 2019, pp. 1-7.
"OpenShift Container Platform installation overview", https://docs.openshift.com/container-platform/4.1/architecture/architecture-installation.html retrieved May 27th relevant to OpenShift Container Platform 4.1 general availability Jun. 4, 2019, pp. 1-13.
"Overview: Templates", https://docs.openshift.com/container-platform/3.9/dev_guide/templates.html retrieved May 24, 2022 relevant to OpenShift Container Platform 3.9 general availability Oct. 2018, pp. 1-27.
"Pivotal CF 1.3 App Dashboard and Usage Reports", YouTube https://www.youtube.com/watch?v=ipGUbjh8IUY, Sep. 25, 2014, pp. 1.
"Pivotal Cloud Foundry Documentation", Pivotal Version 2.0 https://resources.docs.pivotal.io/pdfs/pcf-docs-2.0.pdf, Dec. 20, 2018, pp. 1-1591.
"Red Hat Enterprise Linux CoreOS (RHCOS)", https://docs.openshift.com/container-platform/4.1/architecture/architecture-rhcos.html retrieved May 27, 2022 relevant to OpenShift Container Platform 4.1 general availability Jun. 4, 2019, pp. 1-16.
"Template Service Broker", https://docs.openshift.eom/container-platform/3.9/architecture/service_catalog/template_service_broker.html retrieved May 24, 2022 relevant to OpenShift Container Platform 3.9 general availability Oct. 2018, pp. 1-2.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Feb. 5, 2019, pp. 1-40.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Mar. 6, 2019, pp. 6-40.
"The Service Mesh Era: Architecting, Securing and Managing Microservices with Istio", Google Cloud https://services.google.com/fh/files/misc/the_service_mesh_era_architecting_securing_and managing_microservices_with_istio_white_paper.pdf, Jan. 22, 2019, pp. 1-40.
"Understanding OpenShift Container Platform development", https://docs.openshift.eom/container-platform/4.1/architecture/understanding-development.html retrieved May 27, 2022 relevant to OpenShift Container Platform 4.1 general availability Jun. 4, 2019, pp. 1-18.
"VIDEO—Intro to IBM Edge Application Manager", IBM https://www.ibm.com/cloud/blog/intro-to-ibm-edge-application-manager. May 13, 2020, pp. 1-16.
"VMware Announces VMware Tanzu Portfolio to Transform the Way Enterprises Build, Run and Manage Software on Kubernetes", VMware News & Stories https://news.vmware.com/releases/vmware-announces-vmware-tanzu-portfolio-to-transform-the-way-enterprises-build-run-and-manage-software-on-kubernetes, Aug. 26, 2019, pp. 1-11.
"VMware Cloud Universal—A flexible subscription program to accelerate multi-cloud objectives", VMware | Solution Overview https://www.vmware.com/content/dam/digitalmarketing/vmware/en/pdf/products/vmware-cloud-universal-solution-brief.pdf, Feb. 2021, pp. 1-4.
"VMware Enterprise PKS Architecture Overview", YouTube https://www.youtube.com/watch?v=504FGHukY8Y, Feb. 9, 2018, pp. 1.

(56) References Cited

OTHER PUBLICATIONS

"What is Anthos Service Mesh?", Google Cloud | Anthos Service Mesh 1.4 https://cloud.google.com/service-mesh/v1.4/docs/overview, Dec. 20, 2019, pp. 1-4.
"What is Anthos?", YouTube | Google Cloud Tech https://www.youtube.com/watch?v=Qtwt7QcW4J8, Apr. 21, 2020, pp. 1.
Balkan, Ahmet Alp, "What's new in Cloud Run for Anthos", Google Cloud https://cloud.google.com/blog/products/serverless/new-features-in-cloud-run-for-anthos-ga, Dec. 11, 2019, pp. 1-7.
Goodison, Donna, "Google Cloud Unleashes Managed Service Mesh, Serverless For Anthos", The Channel Co. CRN https://www.crn.com/news/cloud/google-cloud-unleashes-managed-service-mesh-serverless-for-anthos, Sep. 16, 2019, pp. 1-6.
Holzle, Urs , et al., "Introducing Anthos: An entirely new platform for managing applications in today's multi-cloud world", Google Cloud https://cloud.google.com/blog/topics/hybrid-cloud/new-platform-for-managing-applications-in-todays-multi-cloud-world, Apr. 9, 2019, pp. 1-7.
Islam, Tariq , et al., "5 frequently asked questions about Google Cloud Anthos", Google Cloud https://cloud.google.com/blog/topics/hybrid-cloud/5-frequently-asked-questions-about-google-cloud-anthos, Jun. 20, 2019, pp. 1-5.
Introducing GKE Autopilot: a revolution in managed Kubernetes, Google Cloud | https://cloud.google.com/blog/products/containers-kubernetes/introducing-gke-autopilot .Feb. 24, 2021 ,pp. 9.
Colbert,Kit et al., Announcing VMware vSphere with Tanzu: The Fastest Way to Get Started with Kubernetes, VMWare | https://blogs.vmware.com/vsphere/2020/09/announcing-vsphere-with-tanzu.html .Sep. 15. 2020 ,pp. 7.
McConville,Anton et al., A brief history of Kubernetes, OpenShift, and IBM, IBM Developer Blog | https://developer.ibm.com/blogs/a-brief-history-of-red-hat-openshift/ ,Aug. 1, 2019 ,pp. 9.
Tamura,Yoshi et al., GPUs as a service with Kubernetes Engine are now generally available, Google Cloud | https://cloud.google.com/blog/products/gcp/gpus-service-kubernetes-engine-are-now-generally-available ,Jun. 19, 2018 ,pp. 5.
Zhao,Zuoran et al., DeepThings: Distributed Adaptive Deep Learning Inference on Resource-Constrained IoT Edge Clusters, IEEE Transactions on Computer-Aided Design of Integrated Circuits and Systems, vol. 37, No. 11 | doi: 10.1109/TCAD.2018.2858384. ,Nov. 2018 ,pp. 2348-2359.
OpenShift Container Platform Architecture, https://docs.openshift.com/container-platform/4.5/architecture/architecture.html retrieved May 24, 2022 relevant to OpenShift Container Platorm 4.5 general availability Jul. 13, 2020 ,pp. 1-10.
Service Catalog, https://docs.openshift.eom/container-platform/3.9/architecture/service_catalog/index.html retrieved May 24, 2022 relevant to OpenShift Container Platform 3.9 general availability Oct. 2018 ,pp. 1-9.
Architecting VMware Unified Access Gateway, https://www.youtube.com/watch?v=URSdJ9qCQKo&t=234s ,Apr. 17, 2019 ,pp. 1.
Cisco Edge Intelligence At-a-Glance, Cisco https://www.cisco.com/c/en/us/solutions/collateral/internet-of-things/at-a-glance-c45-743263.html ,Nov. 3, 2020 ,pp. 1-3.
Cisco Edge Intelligence Data Sheet, Cisco https://www.cisco.com/c/en/us/solutions/collateral/internet-of-things/datasheet-c78-743838.html ,Aug. 17, 2020 , pp. 1-8.
IBM Edge Application Manager, IBM https://www.ibm.com/cloud/edge-application-manager ,May 5, 2020.
Installation and Update OpenShift Container Platform Installation Overview, https://docs.openshift.com/container-platform/4.5/architecture/architecture-installation.html retrieved May 24th relevant to OpenShift Container Platform 4.5 general availability Jul. 13, 2020 ,pp. 1-17.
OpenShift Container Platform Architecture, https://docs.openshift.com/container-platform/4.5/architecture/architecture.html retrieved May 24, 2022 relevant to OpenShift Container Platform 4.5 general availability Jul. 13, 2020 ,pp. 1-10.
Overview: OpenShift Container Platform, https://docs.openshift.com/container/platform/3.9/getting_started/index.html retrieved May 24th relevant to OpenShift Container Platform 3.9 general availability Oct. 2018 ,pp. 1-2
Overview: OpenShift v3, https://docs.openshift.com/container-platform/3.9/architecture/index.html retrieved May 24, 2022 relevant to OpenShift Container Platform 3.9 general availability Oct. 2018 ,pp. 1-9
Red Hat Enterprise Linux CoreOS (RHCOS), https://docs.openshift.com/container-platform/4.5/architecture/architecture-rhcos.html retrieved May 24, 2022 relevant to OpenShift Container Platform 4.5 general availability Jul. 13, 2020 ,pp. 1-19.
Service Catalog, https://docs.openshift.com/container-platform/3.9/architecture/service_catalog/index.html retrieved May 24, 2022 relevant to OpenShift Container Platform 3.9 general availability Oct. 2018 ,pp. 1-9.
Understanding OpenShift Container Platform development, https://docs.openshift.com/container-platform/4.5/architecture/understanding-development.html retrieved May 24, 2022 relevant to OpenShift Container Platform 4.5 general availability Jul. 13, 2020 ,pp. 1-17.
VMware Tanzu Mission Control Demo, YouTube https://www.youtube.com/watch?v=7m9S4HilJlo ,Aug. 28, 2019 ,pp. 1
Ben-David,Jacob et al., Google Cloud's Anthos—Everything You Need To Know, Turbonomic Blog https://blogturbonomic.com/google-clouds-anthos ,Apr. 15, 2019 ,pp. 1-9.
Param,Sunil et al., Google's Coral: A new product development platform with local AI, TechGig | https://content.techgig.com/technology/googles-coral-a-new-product-development-platform-with-local-ai/articleshow/69042955.cms , Apr. 26, 2019 ,pp. 1-18.
Perry,Yifat et al., Google Anthos: The First True Multi Cloud Platform?, NetApp https://cloud.netapp.com/blog/gcp-cvo-blg-google-anthos-the-first-true-multi-cloud-platform ,Mar. 18, 2021 ,pp. 1-9.
Harnik, Danny , et al., "Secure Access Mechanism for Cloud Storage", vol. 12, No. 3, pp. 317-336. [Retrieved from internet on Feb. 14, 2023], <https://scpe.org/index.php/scpe/article/view/727>, 2011, pp. 317-336.
"Cloud, Fog and Edge Computing—What'sthe Difference?", https://www.winsystems.com/cloud-fog-and-edge-computing-whats-the-difference/, Dec. 4, 2017, pp. 1-10.
"IoT: Understanding the shift fromcloud to edge computing", https://internetofbusiness.com/shift-from-cloud-to-edge-computing/, Aug. 14, 2018, pp. 1-9.
Ai, Yuan , et al., "Edge computing technologies for Internet of Things: a primer", Digital Communications and Networks 4 | https://doi.org/10.1016/j.dcan.2017.07.001, 2018, pp. 77-86.
O'Keefe, Megan , "Edge Computing and the Cloud-NativeEcosystem", TheNewStack | https://thenewstack.io/edge-computing-and-the-cloud-native-ecosystem/, Apr. 18, 2018, pp. 1-11.
Ren, Ju , et al., "Edge Computing for the Internet of Things", IEEE Journals & Magazine | vol. 32 Issue: 1, 2008, pp. 1-6.
U.S. Appl. No. 17/932,235 titled "Apparatus and Method for Depoying a Mobile Device as a Data Source in an IoT System" filed Sep. 14, 2022.
U.S. Appl. No. 18/047,623 titled "Common Services Model for Multi-Cloud Platform" filed Oct. 18, 2022.
Introducing GKE Autopilot: a revolution in managed Kubernetes, Google Cloud | https://cloud.google.com/blog/products/containers-kubernetes/introducing-gke-autopilot ,Feb. 24, 2021 ,pp. 9.
VMware Workspace ONE Access: Feature Walk-through, YouTube | https://www.youtube.com/watch?v=LGQRUe2vKWs ,Feb. 19, 2020 ,pp. 1.
VSphere With Tanzu—Networking with vSphere Distributed Switch., YouTube | https://www.youtube.com/watch?v=0pl65Kn9AKk ,Sep. 16, 2020 ,pp. 1.
Benson,Mark et al., Technical Introduction to VMware Unified Access Gateway for Horizon Secure Remote Access, VMWare | https://blogs.vmware.com/euc/2015/09/what-is-vmware-unified-access-gateway-secure-remote-access.html ,Sep. 9, 2015 ,pp. 8.
Colbert,Kit et al., Announcing VMware vSphere with Tanzu: The Fastest Way to Get Started with Kubernetes, VMWare | https://blogs.vmware.com/vsphere/2020/09/announcing-vsphere-with-tanzu.html ,Sep. 15, 2020 ,pp. 7.

(56) References Cited

OTHER PUBLICATIONS

Foley,Mike et al., vSphere 7—Introduction to the vSphere Pod Service, VMWare | https://blogs.vmware.com/vsphere/2020/04/vsphere-7-vsphere-pod-service.html ,Apr. 9, 2020 ,pp. 8.
Hagoort,Niels et al., vSphere 7—A Closer Look at the VM DRS Score, VMWare | https://blogs.vmware.com/vsphere/2020/05/vsphere-7-a-closer-look-at-the-vm-drs-score.html ,May 21, 2020 ,pp. 8.
Hagoort,Niels et al., vSphere 7—Assignable Hardware, VMWare | https://blogs.vmware.com/vsphere/2020/03/vsphere-7-assignable-hardware.html ,Mar. 31, 2020 ,pp. 7.
Hagoort,Niels et al., vSphere 7—Improved DRS, VMWare | https://blogs.vmware.com/vsphere/2020/03/vsphere-7-improved-drs.html ,Mar. 25, 2020 ,pp. 8.
Handy,Alex et al., Using a Citrix ADC for the OpenShift Control Plane, Red Hat | https://cloud.redhat.com/blog/using-a-citrix-adc-for-the-openshift-control-plane ,Oct. 6, 2020 ,pp. 5.
Iyengar,Ashok et al., 5G at the Edge, https://www.ibm.com/cloud/blog/5g-at-the-edge ,Nov. 12, 2020 ,pp. 1-13.
Iyengar,Ashok et al., Analytics at the Edge, https://www.ibm.com/cloud/blog/analytics-at-the-edge ,Jun. 8, 2020 ,pp. 1-13.
Iyengar,Ashok et al., Architecting at the Edge, https://www.ibm.com/cloud/blog/architecting-at-the-edge ,Oct. 21, 2019 ,pp. 1-14.
Iyengar,Ashok et al., Architectural Decisions at the Edge, https://www.ibm.com/cloud/blog/architectural-decisions-at-the-edge ,Jul. 26, 2019 ,pp. 1-16.
Iyengar,Ashok et al., Automation at the Edge, https://www.ibm.com/cloud/blog/automation-at-the-edge ,Feb. 18, 2017 ,pp. 1-13.
Iyengar,Ashok et al., Cloud at the Edge, https://www.ibm.com/cloud/blog/cloud-at-the-edge ,Feb. 26, 2019 , pp. 1-9.
Iyengar,Ashok et al., DevOps at the Edge, https://www.ibm.com/cloud/blog/devops-at-the-edge ,Dec. 3, 2015 ,pp. 1-13.
Iyengar,Ashok et al., GitOps at the Edge, https://www.ibm.com/cloud/blog/gitops-at-the-edge ,Nov. 2, 2017 , pp. 1-13.
Iyengar,Ashok et al., Models Deployed at the Edge, https://www.ibm.com/cloud/blog/models-deployed-at-the-edge ,Mar. 30, 2020 ,pp. 1-17.
Iyengar,Ashok et al., Policies at the Edge, https://www.ibm.com/cloud/blog/policies-at-the-edge ,Jan. 22, 2020 ,pp. 1-13.
Iyengar,Ashok et al., Rounding Out the Edges, https://www.ibm.com/cloud/blog/rounding-out-the-edges ,May 7, 2019 ,pp. 1-11.
Iyengar,Ashok et al., Security at the Edge, https://www.ibm.com/cloud/blog/security-at-the-edge ,May 12, 2020 , pp. 1-17.
Lee,Brandon et al., What is VMware vSphere 7 Assignable Hardware?, https://www.virtualizationhowto.com/2020/06/what-is-vmware-vsphere-7-assignable-hardware/ ,Jun. 25, 2020 ,pp. 8.
McConville,Anton et al., A brief history of Kubernetes, OpenShift, and IBM, IBM Developer Blog | https://developer.ibm.com/blogs/a-brief-history-of-red-hat-openshift/ ,Aug. 1, 2019 ,pp. 9.
Menezes,Alexandre et al., Introduction to Security Contexts and SCCs, Red Hat | https://cloud.redhat.com/blog/introduction-to-security-contexts-and-sccs ,Mar. 16, 2020 ,pp. 7.
Paladi,Nicolae et al., Domain Based Storage Protection with Secure Access Control for the Cloud, https://dl.acm.org/doi/pdf/101145/2600075.2600082 ,2014 ,pp. 35-42.
Sahu,Aditya et al., The Fast Lane for Data Transfer—Paravirtual RDMA(PVRDMA) Support for Native Endpoints., VMWare | https://blogs.vmware.com/vsphere/2020/10/para-virtual-rdma-support-for-native-endpoints.html ,Oct. 15, 2020, pp. 7.
Seget,Vladan et al., VMware vSphere 7 DRS scoring and configuration, 4sysops | https://4sysops.com/archives/vmware-vsphere-7-drs-scoring-and-configuration/ ,Feb. 19, 2021 ,pp. 10.
Tamura,Yoshi et al., GPUs as a service with Kubernetes Engine are now generally available, Google Cloud | https://cloud.google.com/blog/products/gcp/gpus-service-kubernetes-engine-are-now-generally-available ,Jun. 19, 2018 ,pp. 5.
West,Michael et al., vSphere With Tanzu—Getting Started with vDS Networking Setup, VMWare | https://blogs.vmware.com/vsphere/2020/10/vsphere-with-tanzu-the-fastest-way-to-deliver-kubernetes-on-vsphere.html ,Oct. 8, 2020 ,pp. 8.
Wiggers,Steef-Jan et al., Google Kubernetes Engine 1.10 Is Generally Available and Enterprise Ready, InfoQ | https://www.infoq.com/news/2018/06/google-kubernetes-engine-1.10-ga ,Jun. 1, 2018, pp. 4.
Zhao,Zhuoran et al., DeepThings: Distributed Adaptive Deep Learning Inference on Resource-Constrained IoT Edge Clusters, IEEE Transactions on Computer-Aided Design of Integrated Circuits and Systems, vol. 37, No. 11 | doi: 10.1109/TCAD.2018.2858384. ,Nov. 2018 ,pp. 2348-2359.
Angelas, "*Java Heap Space* vs. *Stack Memory: How Java Applications Allocate Memory*", stackify.com, Sep. 5, 2017, pp. 1-3.
Angelas, "*Java Heap Space* vs. *Stack Memory: How Java Applications Allocate Memory*", stackify.com, Sep. 6, 2017, pp. 1-3.
Beltre, Angel , et al., "Enabling HPC workloads on Cloud Infrastructure using Kubernetes Container Orchestration Mechhanisms", 2019 IEEE/ACM Workshop on Containers and New Orchestration Paradigms for Isolated Environments in HPC (CANOPIEHPC), 2019, pp. 11-20.
Warke, Amit , et al., "Storage Service Orchestration with Container Elasticity", 2018 IEEE 4th International Conference on Collaboration and Internet Computing DOI 10.1109/CIC.2018.00046, 2018, pp. 283-292.

\* cited by examiner

GENERIC PROXY ENDPOINTS USING PROTOCOL TUNNELS INCLUDING LIFE CYCLE MANAGEMENT AND EXAMPLES FOR DISTRIBUTED CLOUD NATIVE SERVICES AND APPLICATIONS

TECHNICAL FIELD

The present disclosure relates generally to systems and methods for generic proxying, including creation of communication tunnels. Examples may be used for distributed cloud native services. Examples of the dynamic addition of proxy application programming interface (API) endpoints and/or domain name system (DNS) endpoints by a proxy service of a Platform-as-a-Service (PaaS) manager are described.

BACKGROUND

Modern cloud-native applications are often built on top of containers based on a microservices architecture. In some instances, containers run on a shared resource pool of a cluster. Key sharable functionalities of these containerized applications are exposed as services (e.g., web server service, eCommerce service, database service, monitoring service like Prometheus® or Grafana® visualization, cluster management and monitoring services like Kubernetes® dashboard or Kiali, and the like). From within the cluster, the services are typically accessible via a registry such as the domain name system (DNS). When the cluster is hosted in the public cloud (e.g., Amazon Web Services (AWS)®, Microsoft Azure®, Google Cloud Platform (GCP)®, etc.), the cluster services can be made accessible from outside using ingress controllers and/or load balancers and dynamic DNS services (e.g., route53 for AWS®, etc.). In some cases, when the cluster resides in a private data center, which is usually deployed behind corporate firewalls, there may be no generic way to access such services from outside, without creating exceptions in the firewalls rule. Further, this approach has a risk of potential intrusion threats due to weakened firewall.

Accordingly, it may be desirable to facilitate access to and communication with services in a flexible manner.

BRIEF DESCRIPTION OF THE DRAWINGS

Reference is now made to the following descriptions taken in conjunction with the accompany drawings, in which.

DETAILED DESCRIPTION

Certain details are set forth herein to provide an understanding of described embodiments of technology. However, other examples may be practiced without various ones of these particular details. In some instances, well-known computing system components, virtualization components, circuits, control signals, timing protocols, and/or software operations have not been shown in detail in order to avoid unnecessarily obscuring the descried embodiments. Other embodiments may be utilized, and other changes may be made, without departing from the spirit or scope of the subject matter presented herein.

The present disclosure relates generally to systems and methods for generic (e.g., application- and/or service-agnostic) proxying which may be used for distributed cloud native services. Examples of systems and methods that may generically generate one or more connections between a manager (e.g., a PaaS Management Portal) and services (e.g., hosted locations) are described.

Figure 1:
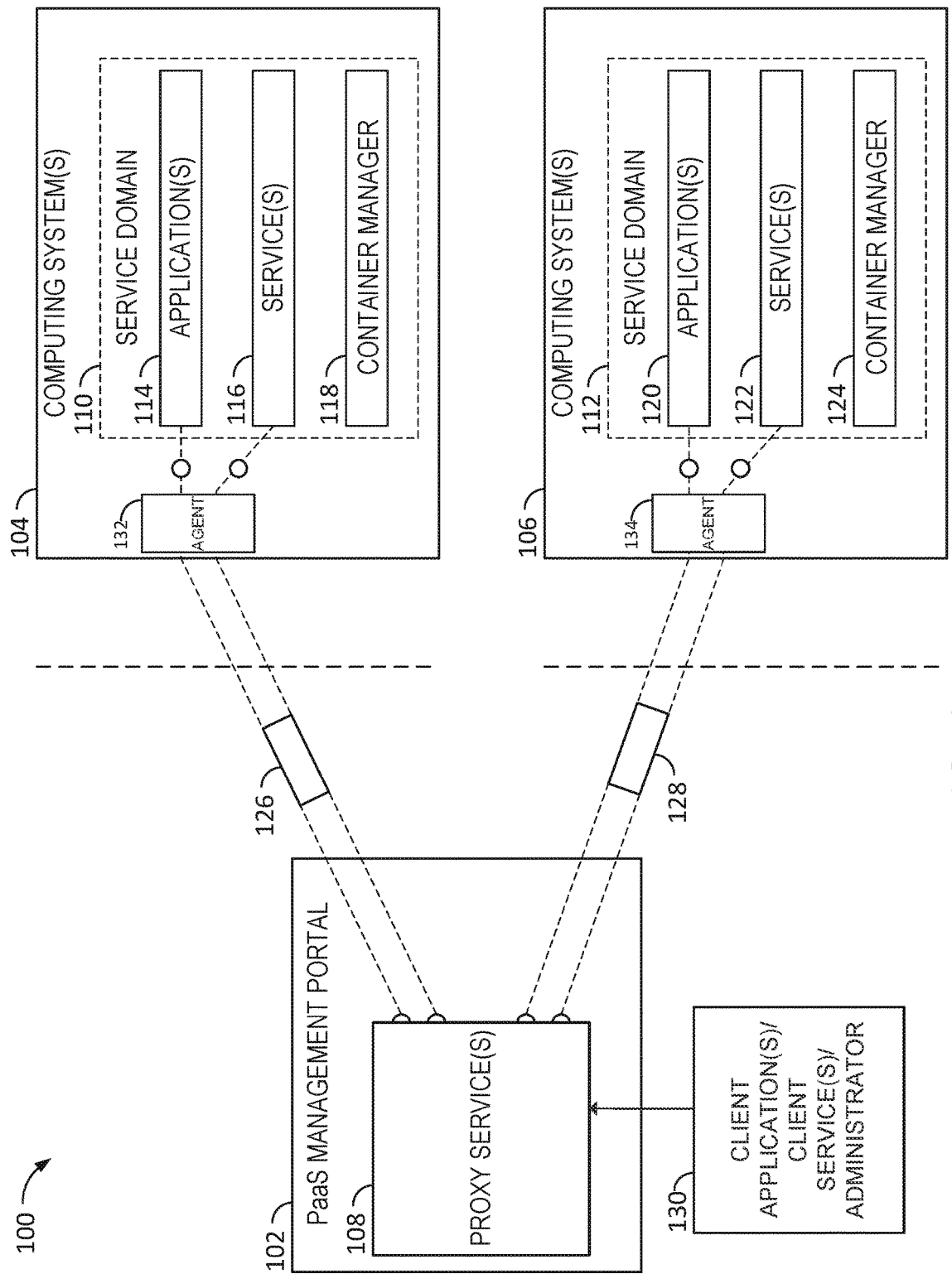
FIG. 1 is a schematic illustration of a system of generic proxying arranged in accordance with examples described herein.

FIG. 1 is a schematic illustration of a generic proxy system 100 for generic proxying for distributed cloud native services, arranged in accordance with examples described herein. As described herein, generic proxying system 100 of FIG. 1 may include a PaaS Management Portal 102, computing system(s) 104, computing system(s) 106, and client application(s)/client service(s)/administrator 130. PaaS Management Portal 102 may include proxy service(s) 106. Computing system(s) 104 may include service domain 110 and agent 132, and computing system(s) 108 may include service domain 112 and agent 134. Service domain 110 may include application(s) 114, service(s) 116, and container manager 118. Service domain 112 may include application(s) 120, service(s) 122, and container manager 124. The proxy service(s) 108 may be used to create one or more tunnel connections to application(s) 114, service(s) 116, application(s) 120, and service(s) 122 via tunnels, such as tunnel 152 and tunnel 154.

Examples of systems described herein may include one or more client applications, client services, and/or administrators, such as client application(s)/client service(s)/administrator 130 of FIG. 1. In some examples, client application(s)/client service(s)/administrator 130 may be deployed (e.g., hosted, etc.) on one or more computing systems accessible by clients and/or administrators, and/or client applications and/or client services, and/or administrator applications and/or administrator services, running and/or operating outside of one or more computing system that host a PaaS Management Portal, such as PaaS Management Portal 102. Generally, a PaaS Management Portal may manage services, e.g., instances or stacks that form part of a platform-as-a-service. Generally, any manager service may be used which manages (e.g., monitors, creates, and/or updates) services on one or more other computing systems.

Examples of client application(s)/client service(s)/administrator 130 of FIG. 1 may be controlled and/or utilized by a client, user, administrator, customer, or the like who may desire to setup and/or use a proxy service, such as proxy service(s) 108, to make available (e.g., create, expose, etc.) endpoints in order to communicate with (e.g., tunnel to) applications and/or services, such as application(s) 114, service(s) 116, application(s) 120, and/or service (122), in other hosted locations, and in some cases, other hosted locations located behind one or more firewalls. As such, in some examples, client application(s)/client service(s)/administrator 130 may not have direct access to application(s) 114, service(s) 116, application(s) 120, and/or service (122) running at a hosted location (e.g., computing system(s) 104 and/or computing system(s) 106) because of the one or more firewalls.

As used herein, while endpoints as discussed herein are in some cases referred to as proxy end-points, proxy-endpoints, and/or proxy end-points, it should be appreciated that these terms are interchangeable.

In some examples, a user, customer, administrator, and the like may send a request using client application(s)/client service(s)/administrator 130 to access (e.g., communicate with) applications and/or services hosted in computing systems located behind a firewall, such as application(s) 114 and service(s) 116 of computing system(s) 104 and/or application(s) 120 and service (122) of computing system(s) 106. The request may include a payload, which in some examples may comprise information parameters. In some examples, the information parameters may include, but are not limited to, an application name of the application desired to be accessed or communicate with, an application type of the application desired to be accessed or communicate with, a service name of the service desired to be accessed or communicate with, a service type of the service desired to be accessed or communicate with, a location where the application or service is located, identification, and/or tunneling type specified by the requestor (e.g., user, customer, administrator, etc. of client application(s)/client service(s)/administrator 130).

Examples of systems described herein may include one or more computing systems (such as computing node 400 of FIG. 4) which may host a proxy service (such as proxy service(s) 114 of FIG. 1) described herein. In some examples, a computing system may be a management portal, such as a platform-as-a-service (PaaS) Management Portal 102 of FIG. 1. PaaS Management Portal 102 may have other and/or alternative functionalities in addition to hosting proxy services in some examples. For example, PaaS Management Portal 102 may be used to setup, manage, monitor, upgrade, and/or conduct other operations regarding services made available on computing systems in communication with PaaS Management Portal 102. Other and/or alternative functionalities may further include hosting an API interface and/or a tunnel communication interface (not shown). In some examples, proxy service(s) 108 may include the API interface and/or the tunnel connection interface. In some examples, PaaS Management Portal 102 may be a centralized management plane (MP) for clusters and/or cloud native services. In some examples, the PaaS Management Portal (e.g., centralized MP) may be dynamically controlled by and/or may control or be in communication with an endpoint (e.g., an API endpoint, a DNS endpoint, a public endpoint, a private endpoint, an exposed and/or uncovered endpoint, and/or other endpoints).

Examples of PaaS Management Portal 102 described herein may include one or more proxy services, such as proxy service(s) 108 of FIG. 1. Proxy services described herein may generally provide a generic (e.g., service-agnostic, application-agnostic, etc.) mechanism for creating (e.g., exposing, uncovering, generating, etc.), maintaining (e.g., monitoring), and removing (e.g., delegating, tearing down, etc.) a tunnel communication channel (and/or endpoint) to a service or an application (such as application(s) 114, service(s) 116, application(s) 120, and service(s) 122). A tunnel communication channel (e.g., a tunnel) generally refers to the provision for the proxy service(s) 108 and/or another endpoint to communicate data using a tunneling protocol. A tunneling protocol generally repackages data into another form, such that data created in one format may be received and/or utilized by a destination expecting data in another format. In some examples, tunnels (e.g., tunnel 126, tunnel 128, etc.) may be used to communicate through one or more firewalls (as shown in FIG. 1), such as when the data is packaged in a manner to be passed through the firewall.

Examples of proxy services described herein, such as proxy service(s) 108 of FIG. 1 may create one or more tunnels (e.g., tunnel 126, tunnel 128, etc.), each in accordance with a particular tunneling protocol. The tunneling protocol used may be selected in accordance with a request (e.g., a payload of a request comprising information parameters)—in this manner, proxy services described herein may be quite flexible in supporting tunneling connections to multiple and variable types of services. Examples of tunneling protocols include, but are not limited to, SSH tunneling, IP, Ipv6, GRE, Open VPN, SSTP, IPSec, L2TP, and/or VXLAN. Examples of proxy services described herein manage the life cycle of multiple proxy endpoints (e.g., endpoints, end-points, proxy end-points, etc.) by exposing remote services and/or applications hosted on computing systems (often behind one or more firewalls) over, in some examples, a wide area network (WAN).

Any number of proxy services may be used, although a single one is shown in FIG. 1. Generally, the proxy service may be used to setup, create, generate, expose, operate, maintain, remove, delegate, teardown and/or destroy one or more tunnels and/or endpoints. In some examples, when a threshold number of tunnels have been established and/or are in use or otherwise associated with the proxy service(s) 108, another proxy service may be created (e.g., by the proxy service(s) 108 and/or by PaaS Management Portal 102 and/or by other computing systems). In this manner, the proxy service functionality may scale with demand.

Tunnels described herein may be used to communicate with one or more computing systems. Computing system(s) 104 is shown, for example, in FIG. 1. Computing system(s) 104 may be implemented using a distributed computing system. For example, computing system(s) 104 may be implemented on a set of computing infrastructure—e.g., one or more computing node(s), network(s), and/or storage components. Accordingly, computing system(s) 104 may in some examples be a cluster computing system. Computing system(s) 104 may be implemented in a cloud computing system, a private data center, and/or a different location. Computing system(s) 104 may be a virtualized system, and may include one or more virtualization managers, such as container manager 130 (e.g., Kubernetes). A virtual machine manager may additionally or alternatively be used. In some examples, computing systems described herein, such as computing system(s) 104, may include but are not limited to, a bare metal system service domain(s), a public and/or private cloud computing system service domain(s). As should be appreciated, other examples of computing systems not described are to be considered within the scope of this disclosure.

In an analogous manner, computing system(s) 106 is shown, for example, in FIG. 1 and may also communicate over one or more tunnels (e.g., tunnel 126, tunnel 128, etc.) with the proxy service(s) 108. Computing system(s) 106 may be implemented using a distributed computing system. For example, the computing system(s) 106 may be implemented on a set of computing infrastructure—e.g., one or more computing node(s), network(s), and/or storage components. Accordingly, the computing system(s) 106 may in some examples be a cluster computing system. The computing system(s) 106 may be implemented in a cloud computing system, a private data center, and/or a different location. The computing system(s) 106 may be a virtualized system, and may include one or more virtualization managers, such as container manager 142 (e.g., Kubernetes). A virtual machine manager may additionally or instead be used. In some examples, computing systems described herein, such as computing system(s) 106, may include but are not limited to, a bare metal system service domain(s), a public and/or private cloud computing system service domain(s). As should be appreciated, other examples of computing systems not described are to be considered within the scope of this disclosure.

Computing systems described herein may host one or more services. For example, the computing system 104(s) may host service(s) 116 and the computing system(s) 106 may host service(s) 122. The service(s) may be distributed services (e.g., they may have multiple instances of service across nodes of the computing system which operate together to provide the service). Examples of services including, but are not limited to, encryption services, database services, file system services, directory services, machine learning (ML) services, and/or data services.

Computing systems described herein may host one or more applications. For example, the computing system(s) 104 may host application(s) 114 and the computing system(s) 106 may host application(s) 120. The applications may make use of one or more services to provide end user functionality in some examples.

During operation, a proxy service (e.g., proxy service(s) 108) may receive a request from one or more services and/or applications, such as client application(s)/client service(s)/administrator 130. For example, the proxy service may expose an API interface and/or a tunnel communication interface for receipt of tunnel and/or communication requests. In some examples, the proxy service(s) 108 may receive a request (e.g., an API call) from client application(s)/client service(s)/administrator 130. In some examples, the request may be sent directly from the client service, client application, and/or administrator requesting the communication or tunnel. In some examples, upon receiving the request (e.g., the API request, the API call, etc.) from client application(s)/client service(s)/administrator 130, proxy service(s) 108 may set up (e.g., create, expose, etc.) a proxy application and/or service endpoint (e.g., API endpoint, TCP endpoint, DNS endpoint, etc.) on behalf of the respective application and/or service running on the hosted location and for which client application(s)/client service(s)/administrator 130 desired access and/or communication with.

In some examples, the computing system(s) 104 and/or 106 may include an agent (such as agent 132 and/or agent 134) in communication with one or more applications or services, and the agent may receive the request for communication from the client service or client application or administrator provided by the proxy service. Based on the request, the proxy service(s) 108 may create and/or identify an appropriate tunnel for use by the requestor via an appropriate end point. For example, the proxy service(s) 108 may create and/or identify and/or expose an endpoint for the tunnel.

In some examples, the agent (e.g., agent 132 and/or agent 134) may locate the requested application or service (hosted locally on that computing system, e.g., application(s) 114, service(s) 116, application(s) 120, and/or service(s) 122 of computing system(s) 104 and/or computing system(s) 106) and setup one or more (e.g., one, two, etc.) connections between the proxy service and the hosted service or application. The agent (e.g., agent 132 and/or agent 134), for example, when deployed on a cluster (such as a Kubernetes cluster, for example), may lookup a Kubernetes Service registry and may setup a communication channel with the respective service or application. Agents may be implemented using, for example, one or more software process.

An endpoint generally refers to a portion of a computing system that may perform a tunneling protocol. The endpoint may be implemented, for example, in a virtual machine, a hypervisor, a network interface, and/or a network switch. The endpoint may include software (e.g., executable instructions) for performing the tunneling protocol on data received from client application(s)/client service(s)/administrator 130 and/or sent to associated service(s) or application(s) (e.g., application(s) 114, service(s) 116, application(s) 120, and/or service(s) 122) and/or the PaaS manager (e.g., PaaS Management Portal 102) or other computing system. In some examples, the endpoint may be an API endpoint. In some examples, the endpoint may be a DNS endpoint. Other non-limiting examples of endpoints may include, public endpoints, private endpoints, secure endpoints, multi-tenant endpoints, etc. Endpoints described herein may be protected by one or more of a plurality of authentication mechanisms.

As described herein, the endpoint may be selected and/or created and/or exposed by the proxy service (e.g., proxy service(s) 108) based on a location of a requestor, an identity of a service and/or application requesting the communication, and/or an identification of a tunneling protocol desired. In some examples, the endpoint may be selected and/or created by the proxy service (e.g., proxy service(s) 108) based on the payload of the request from client application(s)/client service(s)/administrator 130, where in some examples, the payload includes information parameters. In some examples, the information parameters may include, but is not limited to, a name and/or a type of the application and/or service requested for communication. In some examples, the proxy service may access stored information about tunneling protocols and determine a tunneling protocol desired for a particular request based on a location and/or service and/or application making the request. In some examples, the tunneling protocol desired may be included in the request and/or derived from the request.

The proxy service may determine (e.g., from stored information regarding existing endpoints) if an existing endpoint is available to service the request. In some examples, the proxy service (e.g., proxy service(s) 108) may create an endpoint to service the request. The creation of an endpoint in some examples may be conditioned on the proxy service determining that no available existing endpoint may service the request.

The proxy service (e.g., proxy service(s) 108) may provide an identification of an endpoint (e.g., the identified and/or created endpoint) responsive to the request. For example, an IP address of the endpoint may be provided back to the requestor (e.g., client application(s)/client service(s)/administrator 130 that sent the request). On receipt of the identification of the endpoint, the client application(s)/client service(s)/administrator 130 may communicate with the endpoint using the tunneling protocol and using the proxy service (e.g., proxy service(s) 108).

In this manner, tunnels may be flexibly (and/or generically) created in accordance with the demand of one or more systems. It may not be necessary to establish, maintain, and/or create dedicated endpoints for specific tunneling protocols or services. Instead, and advantageously, examples described herein may dynamically create tunnel connections on-demand and without a need for services or other requestors to communicate with a predetermined endpoint or using a predetermined tunneling protocol. Note that data traffic using tunnels described herein is bidirectional—data is provided from a proxy service using the tunneling protocol to services or applications running on remote computing systems, and data may be received at the proxy service from the services and applications running on remote computing systems. The data received at the proxy service may be used by other computing systems. For example, the data received at the computing system(s) 104 and/or 106, and/or central computing system 204 of FIG. 2 may be used by the PaaS manager (e.g., PaaS Management Portal 102) to manage one or more platform services running on remote computing systems.

In some examples, the proxy service(s) 108 may add (e.g., dynamically, manually, or otherwise) routing rules to direct information traffic between Proxy Service(s) 108 and/or application endpoint at PaaS Manager Portal 102 and the hosted application or service location (e.g., computing system(s) 104, computing system(s) 106, etc.) of applications and/or services, such as application(s) 114, service(s) 116, application(s) 120, and/or service(s) 122. In some examples, routing rules may include Ingress rules. As should be appreciated, in some examples, Ingress rules may comprise a set of rules for processing a frame or a packet that is received on a switch port. In some examples, Ingress rules may enforce virtual local area network (VLAN) (or other) tagging standards based on, in some examples, the actual defined port type. In some examples, Ingress rules may apply to inbound data of a switch port. Stated differently, in some examples, an Ingress rule may chart how an application and/or a service, housed in a cluster, may be accessed. In some examples, the proxy service(s) 108 may aggregate several Ingress rules into a single (or in some examples, multiple) Ingress definitions to apply.

In some examples, and as described herein, proxy service(s) 108 may further enable proxy endpoint management. In some examples, proxy endpoint management may happen over a wireless access network (WAN). In some examples, proxy service(s) 108 may monitor one or more (and in some examples, all) proxy-service endpoints in PaaS Management Portal 102. In some examples, proxy service(s) may monitor one or more of the proxy-service endpoints it created in PaaS Management Portal 102. In some examples, proxy service(s) 108 may monitor one or more proxy-service end points, including both endpoints created by proxy service(s) 108, and endpoints created by other proxy services. In some examples, proxy service(s) 108 may monitor one or more pre-existing proxy-service end points in PaaS Management Portal 102. In some examples, the proxy service(s) 108 may monitor the endpoints to ensure each endpoint's underlying tunnel (e.g., tunnel connection) remains functional (e.g., able to transmit and receive data between the PaaS Management Portal 102 and computing system(s) 104 and/or 106).

In some examples, if a tunnel breaks down due to, for example, network error, proxy service(s) 108 may re-establish the tunnel (e.g., the tunnel connection). Advantageously, some examples, the monitoring of the endpoints by proxy service(s) 108 may guarantee (or help ensure) that users, customers, administrators, of proxy service(s) 108 via client application(s)/client service(s)/administrator 130 (or other applications, services, and/or agents) do not need to independently manage life cycle of network connections to the hosted services and applications on remote computing systems over wide area networks.

In some examples, and as described herein, proxy service(s) 108 may further delete, remove, teardown, etc. an endpoint. In some examples, proxy service(s) 108 may remove an existing endpoint. In some examples, proxy service(s) 108 may remove an endpoint that proxy service(s) 108 created. In some examples, proxy service(s) 108 may remove a single endpoint. In some examples, proxy service(s) 108 may remove more than one endpoints. In some examples, proxy service(s) 108 may remove more than one endpoint in simultaneously, consecutively, or combinations thereof. In some examples, proxy service(s) 108 may remove one or more endpoints via an API request sent by, for example, a user, customer, administrator, or the like, of client application(s)/client service(s)/administrator 130.

As one non-liming example, proxy service(s) 108 may delete (e.g., teardown) an HTTP service proxy (e.g., DELETE/httpserviceproxies/{id}). In some examples, proxy service(s) 108 may delete HTTP service proxy by removing a DNS route (e.g., a Voyager route, etc.) and removing the Kubernetes service that points to the host/port. In some examples, if SD is connected, proxy service(s) 108 may send a websocket message to SD to terminate the host/port session. In some examples, if the session is the last from the SD, proxy service(s) 108 may terminate the websocket connection as well. In some examples, proxy service(s) 108 may terminate the TCP server running at the host/port. In some examples, proxy service(s) 108 may then delete the DB entry from the http_service_proxy_model table.

In some examples, and as described herein, proxy service(s) 108 may further provide security for proxy-endpoints (e.g., endpoints). In some examples, an automated expiry request may be requested by a user, customer, administrator, etc. of client application(s)/client service(s)/administrator 130. In examples, upon receipt of the automated expiry request, proxy service(s) 108 may delete the underlying protocol tunnels associated with the automated expiry request after the proxy endpoint is/has expired. As described herein, proxy-endpoints may further be protected by additional authentication mechanisms (e.g., password protection, etc.) over https.

In this way, proxy service(s) 108 may manage and/or enable life cycle management of the proxy pipeline via the setup, creation, generation, exposing, operation, maintenance, removal, delegation, deletion, teardown, and/or destruction one or more tunnels and/or endpoints. In other words, proxy service(s) 108 may manage and/or enable proxy keep alive, proxy expiration auto tear down, and proxy resource clean up, etc. In this way, proxy service(s) 108 may create a proxy connection that is reliable via TCP with keep alive in the control channel to keep the connection open. As should be appreciated, while creation, maintenance, and removal of tunnel connections and proxy-endpoints are discussed, it should be appreciated that proxy service(s) 108 may manage pre-existing tunnel connections and/or proxy-endpoints, and/or remove pre-existing tunnel connections and/or proxy-endpoints.

Figure 2:
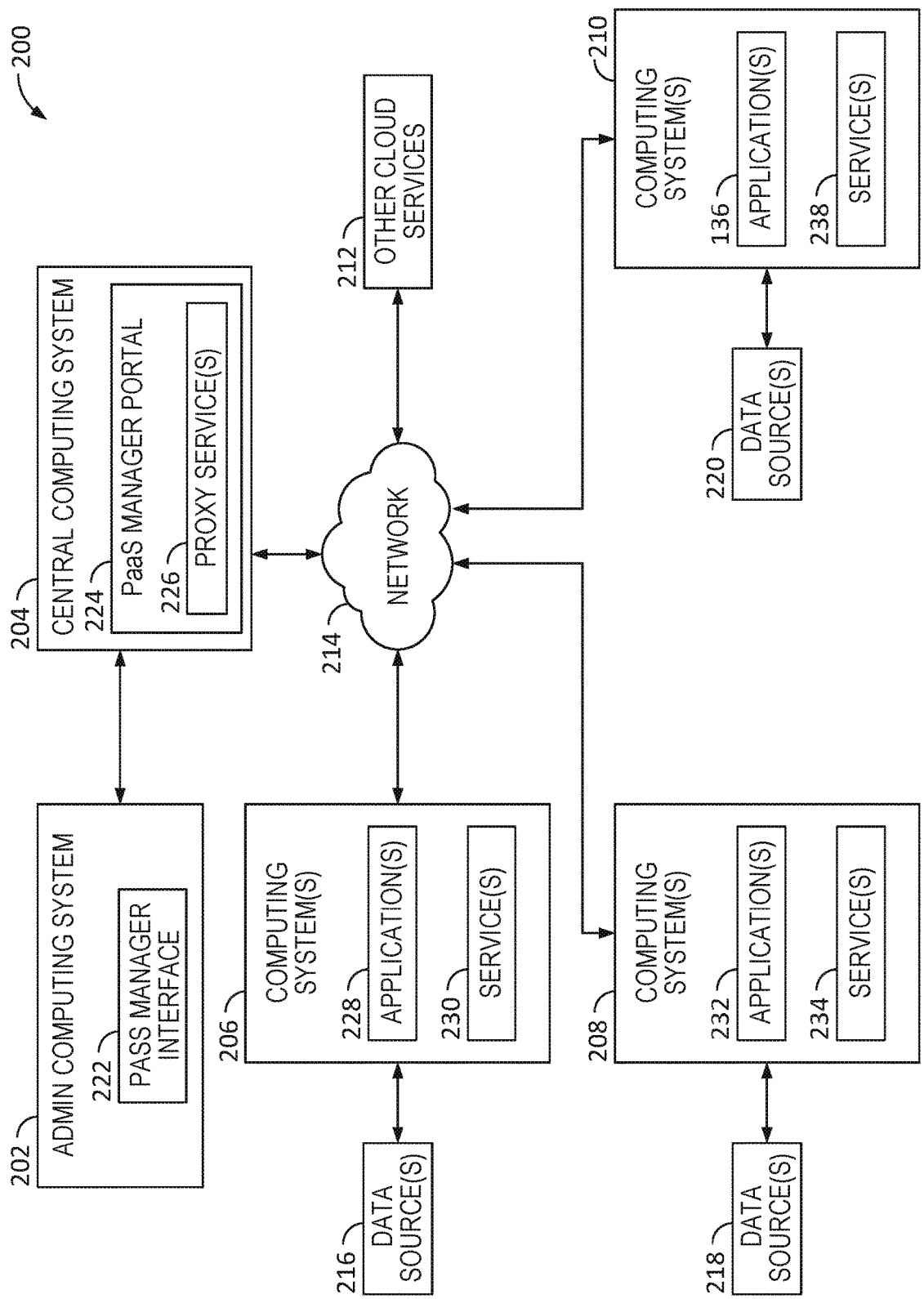
FIG. 2 is a block diagram of a multi-cloud Platform-as-a-Service system, arranged in accordance with examples described herein.

FIG. 2 is a block diagram of a multi-cloud platform as a service system 200, in accordance with an embodiment of the present disclosure. The system 200 may include one or more of any of computing systems(s) 206, which may be coupled to respective data source(s) 216, computing systems (s) 208, which may be coupled to respective data source(s) 218, computing systems (s) 210, which may be coupled to respective data source(s) 220, and/or other cloud services 212 (e.g., other native cloud services, other applications, etc.). The system 200 may further include a central computing system 204 coupled to an administrator computing system 202. The central computing system 204 coupled to administrator computing system 202 may be communicatively coupled to computing systems(s) 206, computing systems(s) 208, computing systems(s) 210, and/or other cloud services via network 214 to management communications within the system 200.

The central computing system 204 may include a PaaS Manager Portal 224 including one or more proxy service(s) 226. The PaaS Manager Portal 224 may be used to implemented and/or may be implemented by, for example, the computing system of FIG. 1. The PaaS Manager Portal 224 may include a proxy service(s) 226 which may be used to implement and/or may be implemented by the proxy service(s) 108 of FIG. 1. In this manner, the central computing system 204 may create, maintain, destroy, and/or otherwise manage tunnels to any or all of the application(s) and/or service(s) shown in FIG. 2. The computing system(s) shown in FIG. 2 may, in some examples, accordingly include agents which may assist facilitation of a tunnel connection for one or more services and/or applications, although in some examples the services or applications may directly facilitate a tunnel connection. The tunnels managed by the proxy service(s) 226 may be created responsive to information parameters included in a payload of a request sent to proxy service(s) 226 by a requester using administrative computing system 202. In some examples, the information parameters may include, but are not limited to, an application name, an application type, a service name, a service type, a location, identification, and/or tunneling type specified by the requestor.

The computing system(s) 206, computing system(s) 208, and/or computing system(s) 210 may be implemented by and/or may be used to implement the computing systems 104 and/or 106 of FIG. 1 in some examples. The network 214 may include any type of network capable of routing data transmissions from one network device (e.g., of the computing system(s) 206, computing system(s) 208, computing system(s) 210, central computing system 204, and/or administrator computing system 202) to another. For example, the network 214 may include a local area network (LAN), wide area network (WAN), intranet, or a combination thereof. The network 214 may include a wired network, a wireless network, or a combination thereof.

Each of the computing systems(s) 206, 208, and/or 210, as well other cloud services 212 may be hosted on a respective computing cluster platform having multiple computing nodes (e.g., each with one or more processor units, volatile and/or non-volatile memory, communication or networking hardware, input/output devices, or any combination thereof) and may be configured to host, for example, respective application(s) 228, 232, and/or 236, as well as respective service(s) 230, 234, and/or 238. In some examples, respective application(s) 228, 232, and/or 236, as well as respective service(s) 230, 234, and/or 238 may be hosted in a respective service domain, such as service domain 110 of FIG. 1 and/or service domain 112 of FIG. 1. In some examples, each of the service domains may be hosted on a respective public or private cloud computing platform (e.g., each including one or more data centers with a plurality of computing nodes or servers having processor units, volatile and/or non-volatile memory, communication or networking hardware, input/output devices, or any combination thereof). In some examples, computing systems described herein, such as computing system(s) 206, 208, and/or 210 may include but are not limited to, a bare metal system service domain(s), a public and/or private cloud computing system service domain(s). As should be appreciated, other examples of computing systems not described are to be considered within the scope of this disclosure.

A computing system as described herein may generally include any one or more of a computing cluster platform, a bare metal system platform, and/or a cloud computing platform (not shown). A service domain as described herein may refer to any of a computing systems, the bare metal system service domain, or the cloud computing system service domain (not shown). Various components of system 200, e.g., administrator computing system 202, central computing system 204, computing system(s) 206, 208, and/or 210, and/or other cloud services 212 may also include PaaS software stacks (not shown). In some examples, PaaS software stacks may include platform-specific software configured to operate on the respective system. The software may include instructions that are stored on a computer readable medium (e.g., memory, disks, etc.) that are executable by one or more processor units (e.g., central processor units (CPUs), graphic processor units (GPUs), tensor processing units (TPUs), hardware accelerators, video processing units (VPUs), etc.) to perform functions, methods, etc., described herein.

In some examples, the computing system(s) 206, other cloud services 212, computing system (s) 210, and/or computing system 208(s) may be behind one or more firewalls from the central computing system 204. Accordingly, requests for communication from a proxy service to an application and/or a service a firewall may include a request (e.g., including, in some examples, a payload comprising information parameters) for a tunnel which may be compatible to data communication through the firewall.

The data source(s) 216, 218, and/or 220 may each include one or more devices or repositories configured to receive, store, provide, generate, etc., respective source data. The data sources may include input/output devices (e.g., sensors (e.g., electrical, temperature, matter flow, movement, position, biometric data, or any other type of sensor), cameras, transducers, any type of RF receiver, or any other type of device configured to receive and/or generate source data), enterprise or custom databases, a data lake (e.g., a large capacity data storage system that holds raw data) or any other source of data consumed, retrieved, stored, or generated by the service domains. The service domain construct may allow a customer and/or user and/or administrator to deploy applications to locations proximate relevant data, in some examples. In some examples, the service domain construct may allow a customer and/or user and/or administrator to deploy applications to computing platforms that have a particular computing resource (e.g., hardware or software configuration) and/or based on computing resource capacity. These applications may provide their own API endpoints, and a proxy service, such as those described herein, may be set up to interface with them using proxy-endpoints. In some examples, the proxy services may setup a proxy-endpoint upon request.

In some examples, various components of the system 200 may need access to other cloud services 212 (e.g., other cloud native services, other applications, etc.). To facilitate communication with the other cloud services 212, computing systems(s) 206, 208, and/or 210 may in some examples, include data pipelines of PaaS software stacks (not shown), which may each may be configured to provide interfaces between projects, applications, and services hosted on computing systems(s) 206, 208, and/or 210 and the other cloud services 212 via the network 214. In some examples, the PaaS software stacks (not shown) may each be configured to host respective data pipeline(s), projects, and/or services. The data pipelines may be configured to provide data from the other cloud services 212 to applications hosted on one or more of the computing systems(s) 206, 208, and/or 210 to aggregate, transform, store, analyze, etc., the data.

Each of the PaaS software stacks (not shown) of computing systems(s) 206, 208, and/or 210 may include one or more applications, data pipelines, ML models, containers, data services, etc., or any combination thereof (e.g., applications). The applications may be configured to receive, process/transform, and output data from and to other applications, and or between a computing system (e.g., computing system(s) 206, 208, and/or 210, and central computing system 204) via communication tunnels (e.g., tunnel 126 and/or tunnel 128 of FIG. 1). The applications may be configured to process respective received data based on respective algorithms or functions to provide transformed data. At least some of the applications may be dependent on availability of supporting services to execute, such as communication services, runtime services, read-write data services, ML inference services, container management services, etc., or any combination thereof.

In some examples, a multi-cloud platform as a service system 200 may be configured to implement generic proxying, including creation of communication tunnels, as described herein. Generally, when an application is generated, successful execution may depend on availability of various additional supporting services, such as a read/write data services (e.g., publish/subscribe service, search services, etc.), data pipeline services, ML inference services, container management services, other runtime or data services, etc., or any combination thereof. The PaaS Manager Portal 224 may abstract deployment of the additional supporting services, as some services may be platform-specific, as well as may manage a lifecycle of the service containers, upgrades and/or patches to the services, etc. In some examples, functionality of the PaaS Manager Portal 224 may be distributed across multiple virtual machine or container instances each configured to manage a respective subset of service domains, projects, services, etc.

In some examples, the PaaS manager interface 222 may include an interface to set up projects and to deploy services to service domains of the various PaaS software stacks (not shown) of computing system (2) 206, 208, and/or 210, and/or other cloud services 212. In some examples, projects can span multiple service domains and can reference cloud profiles.

In some examples, a service can be enabled and/or disabled on a per project basis, such that a service can be used by all apps and pipelines within a project, but may not be accessible to apps and pipelines in other projects. When creating a project, a list of available services may be presented for selection. In addition, the PaaS Management Portal 224 may provide an interface to select/change various configuration parameters for a particular service to be deployed to one or more service domains. In some examples, services may be accessed from applications running inside a project on a service domain or by external clients. The service model may publish an application programming interface (API) endpoint for each project for which the service has been enabled. In some examples, API endpoints may be the same or may be different for different projects. Services can be exposed externally by making the API endpoint public. In some examples, a project may have multiple different endpoints in order to provide different applications different to have types of access to a common service (e.g., read-write, read-only, write-only, etc.). In some examples, when a project is deployed across multiple service domains hosted on different computing platform architectures (e.g., computing system(s) 206, 208, and/or 210, and/or other cloud services 212, the PaaS Management Portal 224 may manage enabling or disabling of a common service on each of the service domains hosting the project in a manner that is transparent to a user (e.g., without user intervention to handle platform-specific differences between the different computing platform architectures).

In some examples, the PaaS Management Portal 224 may provide an interface to update respective configuration parameters or settings for a service. The configuration parameters or settings may be service-specific. In some examples, the configuration parameters may be defined using an OpenAPi schema, in some examples. In some examples, the PaaS Management Portal 224 may also monitor the health of services deployed to service domains, as well as may monitor other service-specific criteria.

In some examples, instantiation and configuration of services may have different scope. For example, one group of services may be service domain-level scope and another group of services may be project-level scope. A distinction may be based on which services are more tightly coupled with a service domain as a whole, and which are more easily separable. For example, a service mesh (e.g., Istio) and/or artificial intelligence (AI) Inference services may be single services within a service domain, with service instances of each being shared across projects. In a specific example, the Istio service mesh is naturally set up to support a single service mesh for a Kubernetes cluster, so scoping the service mesh to a service domain (e.g., Kubernetes cluster counterpart) may allow multiple service meshes. Typically, the AI Inference service may consume significant hardware resources that sometimes cannot be shared across projects (e.g., graphics processor unit resources), and as such, may be configured per service domain to avoid resource conflicts.

Examples of services include but are not limited to data services (e.g., Kafka, Prometheus, Redis). Examples of data services may be multi-tenant and/or non-multitenant in nature, and may be instantiated per project. In addition, from a resource isolation perspective data services may provide better isolation when deployed as multiple instances.

External services may be divided into two categories based on accessibility: 1. private cloud services (e.g., accessible at specific locations and may be accessible behind a firewall); and 2. public cloud services (e.g., globally accessible across locations). Private cloud services may be coupled with service domains that correspond to the specific locations.

The one or more applications of the PaaS software stacks (not shown) of the computing system(s) 206, 208, and/or 210 may be implemented using a containerized architecture that is managed via a container orchestrator and/or a container manager (e.g., container manager 118 of FIG. 1 and/or container manager 124 of FIG. 1). The container orchestration may relate to to containerized management complexity, orchestration, security, and isolation, thereby making it easier for a customer and/or user and/or administrator to focus on managing the applications. The management may be scalable via categories. In some examples, the service domains may be configured to support multi-tenant implementations, such that data is kept securely isolated between tenants. The applications communicate using application programming interface (API) calls, in some examples. In some examples, the supporting services may also be implemented in the containerized architecture.

The PaaS Management Portal 224 hosted on the central computing system 204 may be configured to centrally manage the PaaS infrastructure (e.g., including the service domains on computing system(s) 206, 208, and/or 210) and manage lifecycles of deployed applications. The central computing system 204 may include one or more computing nodes configured (not shown) to host the PaaS Management Portal 224. The central computing system 204 may include a cloud computing system and the PaaS Management Portal 224 (including proxy service(s) 226) may be hosted in the cloud computing system and/or may be delivered/distributed using a software as a service (SaaS) model, in some examples. In some examples, the PaaS Management Portal 224 may be distributed across a cluster of computing nodes of the central computing system 204.

In some examples, an administrative computing system 202 may be configured to host a PaaS manager interface 222. The PaaS manager interface 222 may be configured to facilitate user or customer communication with the PaaS Management Portal 224 to control operation of the PaaS Management Portal 224. The PaaS manager interface 222 may include a graphical user interface (GUI), APIs, command line tools, etc., that are each configured to facilitate interaction between a user and the PaaS Management Portal 224. The PaaS manager interface 222 may provide an interface that allows a user to develop template applications for deployment of the service domains, identify on which service domains to deploy applications, move applications from one service domain to another, remove an application from a service domain, update an application, service domain, or PaaS software stack (e.g., add or remove available services, update deployed services, etc.).

In some examples, the PaaS Management Portal 224 may be configured to manage, for each of the computing platforms, creation and deployment of service domains, creation and deployment of application bundles to the PaaS software stacks, etc. For example, the Management Portal 224 may be configured to create and deploy service domains on one or more of the computing platforms. The computing platforms may include different hardware and software architectures that may be leveraged to create and deploy a service domain. Thus, the PaaS Management Portal 224 may be configured to manage detailed steps associated with generating a service domain in response to a received request.

The PaaS Management Portal 224 may also be configured to build and deploy different types of applications to one or more of the service domains. A user may elect to deploy an application to a type of platform based on various criteria, such as type of and/or availability of a service, proximity to source data, available computing resources (e.g., both type and available capacity), platform cost, etc., physical location of the platform, or any combination thereof.

When an application is generated, successful execution may depend on availability of various additional supporting services, such as a read/write data services (e.g., publish/subscribe service, search services, etc.), ML inference services, container management services, runtime services, etc., or any combination thereof. The PaaS Management Portal 224 may abstract deployment of the additional supporting services, as some of these may be platform-specific, using a common services model. Examples of common services include Ingress, Istio, Prometheus, Kafka, NATS, Postgres Database service, Grafana, email service, etc. Thus, a user and/or administrator and/or customer may provide information directed to an application to be deployed to the PaaS Management Portal 224 and identify one or more target service domains, and the PaaS Management Portal 224 may deploy the application to the target service domains. The target service domains provide services to be used by the application, and accordingly, the application need not include services provided by the service domain. Moreover, the application need not take platform-specific actions which may be typically required for starting those services. The PaaS Management Portal 224 may deploy the respective application to the corresponding one of the one or more identified target service domains. The PaaS Management Portal 224 may further generate tunnels for communication with the services.

The ability of the PaaS Management Portal 224 to abstract platform-specific details for creating and deploying a service domain, services, projects, and/or applications makes it more efficient for users to deploy across a wider selection of cloud computing platforms than would otherwise be considered. Thus, the service domain construct may allow a customer to focus on core concerns with an application, while shifting consideration of supporting services to the PaaS Management Portal 224 and the service domains. The service domain construct may also make applications more "light weight" and modular for more efficient deployment to different service domains. The PaaS manager interface 222 may provide a GUI interface.

The PaaS Management Portal 224 may be configured to generate (e.g., build, construct, update, etc.) and distribute the applications to selected service domains based on the platform-specific architectures of the computing platforms. In some examples, the PaaS Management Portal 224 may facilitate creation of one or more application constructs and may facilitate association of a respective one or more service domains with a particular application construct (e.g., in response to user input).

For example, in response to a request for deployment of a new application, the PaaS Management Portal 224 may determine whether the new application is properly configured to run in a target service domain. The PaaS Management Portal 224 may ensure that service dependencies for the new application are met in the service domains, in some examples, such as deployment of supporting services for the application to a target service domain.

In operation, the system 200 may include any number and combination of computing platforms that may collectively span any type of geographic area (e.g., across continents, countries, states, cities, counties, facilities, buildings, floors, rooms, systems, units, or any combination thereof). The computing platforms within the system 200 may include a wide array of hardware and software architectures and capabilities. Each of the computing platforms may host respective software stacks that include various applications that are configured to receive, process, and/or transmit/store data from one or more of the connected data sources 216, 218, and/or 220 and/or from other applications. The service domain architecture may allow formation of a hybrid cloud computing platform where applications and data can be moved across different computing platforms.

Each of the applications may be configured to process data using respective algorithms or functions, and well as leveraging respective supporting services. In some examples, the algorithms or functions may include any other user-specified or defined function to process/transform/select/etc. received data. The supporting services may include runtime services, read/write data services, communication services, ML inference services, search services, etc., or any combination thereof. In some examples, the service domain for a respective computing platform may be configured to share data with other service domains. The one or more applications of the PaaS software stacks may be implemented using a containerized architecture that is managed via a container orchestrator. The applications may communicate using application programming interface (API) calls, in some examples.

The PaaS Management Portal 224 may be configured to generate or update service domains to host the PaaS software stacks on the computing platforms. The service domains may include deployment of one or more virtual machines or other construct configured to host the respective PaaS software stack. The service domain may identify computing resource types and allocation.

The PaaS Management Portal 224 may be further configured to deploy applications to the PaaS software stacks, as well as supporting services for execution of the application. A user may elect to deploy an application to a type of platform based on various criteria, such as type of service, proximity to source data, available computing resources (e.g., both type and available capacity), platform cost, etc., or any combination thereof. When an application is generated, successful execution may depend on availability of various additional supporting services, such as a read/write data services (e.g., publish/subscribe service, search services, etc.), ML inference services, container management services, runtime services, etc., or any combination thereof. The PaaS Management Portal 224 may abstract deployment of the additional supporting services, as some of these may be platform-specific. Thus, a user may provide information directed to an application to be deployed to the PaaS Management Portal 224 and identify one or more target service domains, and the PaaS Management Portal 224 may deploy a respective application bundle to each of the one or more target service domains, along with a bundle of additional supporting services required for execution of the application bundle.

The proxy service 226 of FIG. 2 may be used to receive requests for communication from any of the applications and/or services and/or users, customers, and or administrators described with respect to FIG. 2 and create and/or identify an endpoint for a tunnel for communication with the requesting application and/or service.

Figure 3:
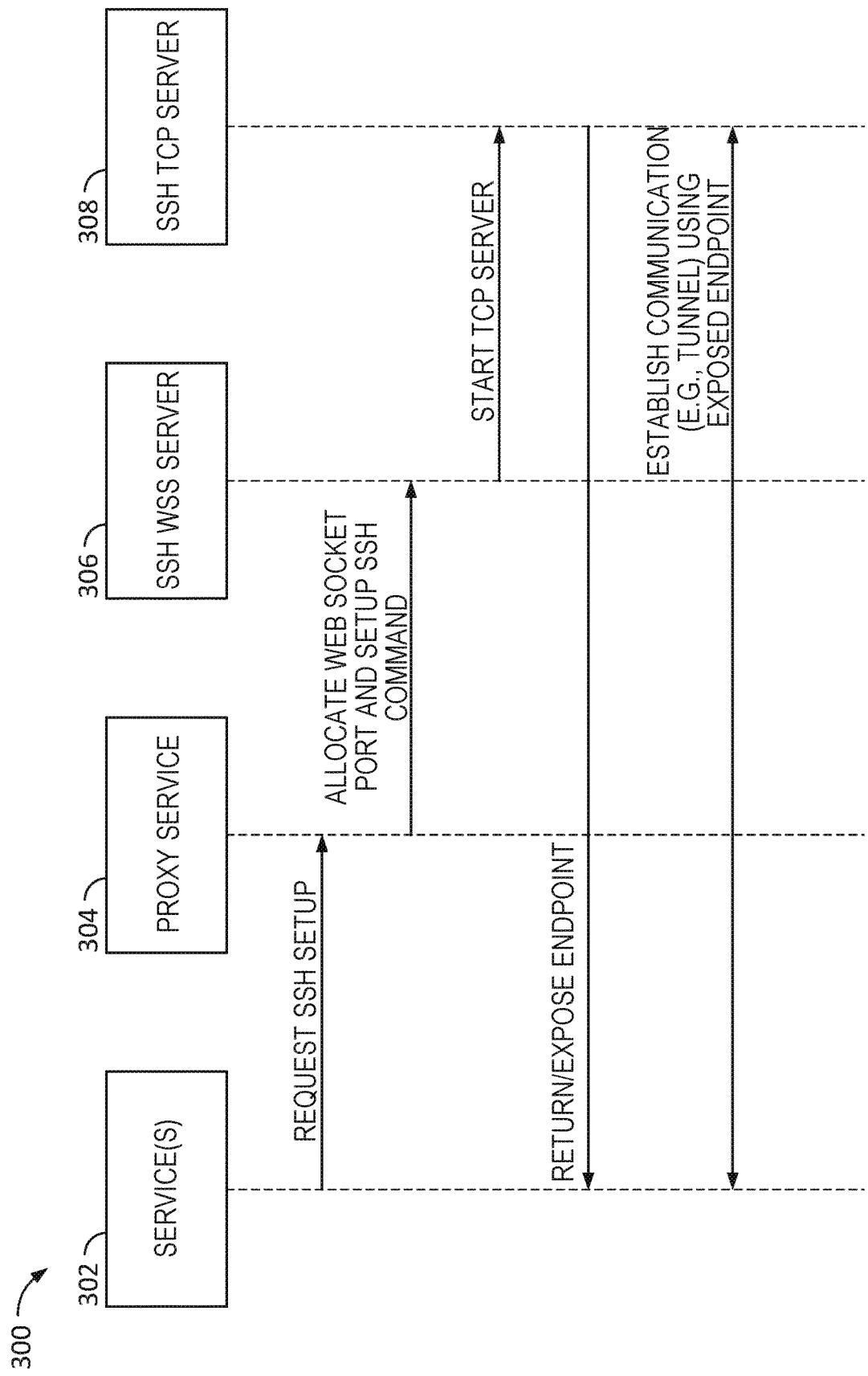
FIG. 3 is an example unified modeling language (UML) sequence diagram of reverse tunneling for SSH access, arranged in accordance with examples described herein.

FIG. 3 is an example unified modeling language (UML) sequence diagram 300 of reverse tunneling for SSH access, arranged in accordance with examples described herein. While various different tunneling protocols may be used to create and/or generate a tunnel connection between a service and/or application at a hosted location and a proxy service, diagram 300 illustrates one SSH-specific connection creation example using generic proxying, including creation of communication tunnels, as described.

Diagram 300 includes service(s) 302 (e.g., service(s) 116 and/or service(s) 122 of FIG. 1, and/or service(s) 230, service(s) 234, and/or service(s) 238 of FIG. 2), proxy service 304 (e.g. proxy service(s) 108 of FIG. 1 and/or proxy service(s) 226 of FIG. 2), secure shell (SSH) websocket (WSS) server 306 (end points of FIG. 1), and SSH transmission control protocol (TCP) server 308 (end points of FIG. 1).

Recall that in some examples, to create the connection between a PaaS Management Portal (e.g., PaaS Management Portal 102 of FIG. 1) and an application and/or service in a hosted location (e.g., service 302, and/or service(s) 116 of FIG. 1 and/service(s) 122 of FIG. 1), a service and/or application may send a request directly from the service or application, the request including a request to open and/or generate and/or create a communication or a tunnel connection. In some examples, and as illustrated in FIG. 3, service(s) 302 may be configured to send such a request (e.g., a request to setup SSH) to a proxy service, such as proxy service 304.

As described, in some examples, proxy services, such as proxy service 304 may support tunneling connections to multiple and variable types of services. Examples of proxy service 304 described herein may create one or more tunnels (e.g., tunnel 126, tunnel 128, etc.), each in accordance with a particular tunneling protocol. Examples of tunneling protocols include, but are not limited to, SSH tunneling, IP, Ipv6, GRE, Open VPN, SSTP, IPSec, L2TP, VLAN, and/or VXLAN. As described herein, and in some examples, once a request has been received, such as a request to setup SSH, a proxy service may create and/or identify an appropriate tunnel for use, e.g., by a request. As illustrated in FIG. 3, upon receipt of the request by service(s) 302 to setup SSH, proxy service 304 may send a request to the SSH WSS server 306 to allocate a websocket port and setup the SSH command.

Figure 4:
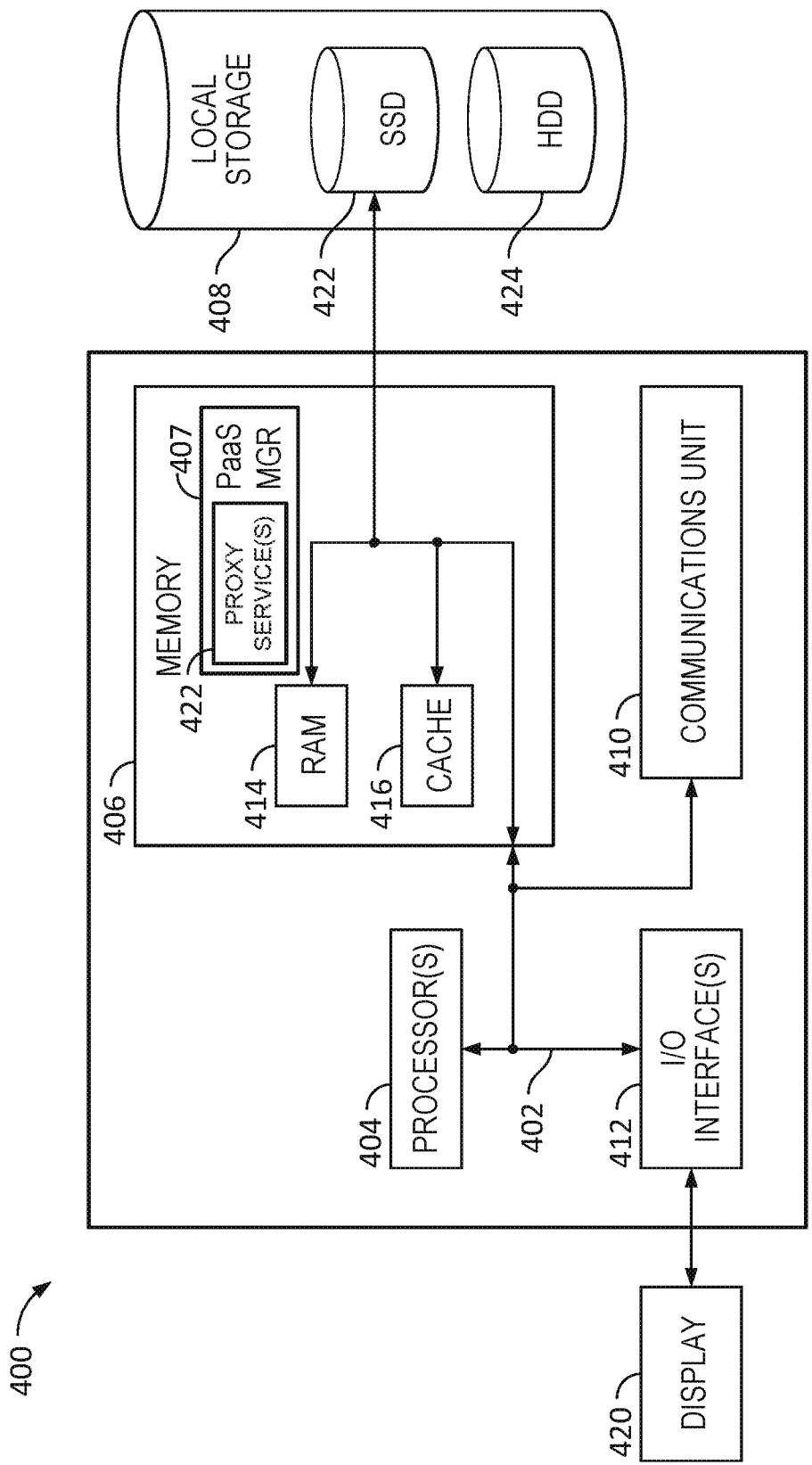
FIG. 4 is an example block diagram of components of a computing node 400, arranged in accordance with examples described herein.

As described, in some examples, servers, such as SSH WSS server 306 and SSH TCP server 308, may include endpoints which may be used, e.g., by a proxy service such as those described herein, to generate a communication tunnel to direct information traffic. In examples, and in response to receiving the request to allocate a websocket port and setup an SSH command, SSH WSS server 306 may send a request to the SSH TCP server to start. In some examples, and in response to the request by SSH WSS server 306, SSH TCP server 308 may return and/or expose endpoints to service(s) 302 to create the communication connection (e.g., tunnel). In some examples, and in response to the endpoint exposure, service(s) 302 may establish a communication connection (e.g., tunnel) using the exposed endpoints, between service(s) 302 and proxy service 304 to create an SSH tunnel for communication. As should be appreciated, while an SSH connection is created in FIG. 3, various other tunneling protocols may use generic proxy systems and methods described herein to generate additional and/or alternative tunnels. For example, examples of tunneling protocols include, but are not limited to, SSH tunneling, IP, Ipv6, GRE, Open VPN, SSTP, IPSec, L2TP, VLAN, and/or VXLAN, FIG. 4 is an example block diagram of components of a computing node 400, arranged in accordance with examples described herein. It should be appreciated that FIG. 4 provides only an illustration of one implementation and does not imply any limitations with regard to the environments in which different embodiments may be implemented. Many modifications to the depicted environment may be made. The computing node 400 may implemented as at least part of the generic proxying system 100 of FIG. 1, multi-cloud platform as a service system 200 of FIG. 2 (or any other computing device or part of any other system described herein). In some examples, the computing node 400 may be a standalone computing node or part of a cluster of computing nodes configured to host a PaaS manager 407 (e.g., PaaS Management Portal 102 of FIG. 1). In addition to or alternative to hosting the PaaS manager 407 (e.g., PaaS Management Portal 102 of FIG. 1), the computing node 400 may be included as at least part of the computing system(s) 104 and/or 106, as described with reference to FIG. 1 and configured to host one or more service domains (e.g., service domain 110 and service domain 112). Additionally, and while not shown, the computing node 400 may be included as at least part of the computing system(s) 104 and/or 106, as described with reference to FIG. 1 and configured to host one or more other computing platforms, applications, and/or services, such as a bare metal computing platform.

The computing node 400 includes a communications fabric 402, which provides communications between one or more processor(s) 404, memory 406, local storage 408, communications unit 410, I/O interface(s) 412. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses.

The memory 406 and the local storage 408 are computer-readable storage media. In this embodiment, the memory 406 includes random access memory RAM 414 and cache 416. In general, the memory 406 can include any suitable volatile or non-volatile computer-readable storage media. In an embodiment, the local storage 408 includes an SSD 422 and an HDD 424.

Various computer instructions, programs, files, images, etc. may be stored in local storage 408 for execution by one or more of the respective processor(s) 404 via one or more memories of memory 406. In some examples, local storage 408 includes a magnetic HDD 424. Alternatively, or in addition to a magnetic hard disk drive, local storage 48 can include the SSD 422, a semiconductor storage device, a read-only memory (ROM), an erasable programmable read-only memory (EPROM), a flash memory, or any other computer-readable storage media that is capable of storing program instructions or digital information.

The media used by local storage 408 may also be removable. For example, a removable hard drive may be used for local storage 408. Other examples include optical and magnetic disks, thumb drives, and smart cards that are inserted into a drive for transfer onto another computer-readable storage medium that is also part of local storage 408.

In some examples, the local storage may be configured to store a PaaS manager 407 (e.g., PaaS Management Portal 102 of FIG. 1) that is configured to, when executed by the processor(s) 404, provide a generic (e.g., service-agnostic, application-agnostic, etc.) mechanism for creating a tunnel communication channel to a service or an application via proxy service(s) 422 (e.g., proxy service(s) 108 of FIG. 1). In some examples, the PaaS manager 407 (e.g., PaaS Management Portal 102 of FIG. 1), including to service(s) 422 (e.g., proxy service(s) 108 of FIG. 1) may provide an interface to receive parameters (e.g., information parameters) included in the payload of an API request.

Communications unit 410, in these examples, provides for communications with other data processing systems or devices. In these examples, communications unit 410 includes one or more network interface cards. Communications unit 410 may provide communications through the use of either or both physical and wireless communications links.

I/O interface(s) 412 allows for input and output of data with other devices that may be connected to computing node 400. For example, I/O interface(s) 412 may provide a connection to external device(s) 418 (not shown) such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present disclosure can be stored on such portable computer-readable storage media and can be loaded onto local storage 408 via I/O interface(s) 412. I/O interface(s) 412 also connect to a display 420.

Display 420 provides a mechanism to display data to a user and may be, for example, a computer monitor. In some examples, a GUI associated with the PaaS manager interface 222 of FIG. 2 may be presented on the display 420.

Figure 5:
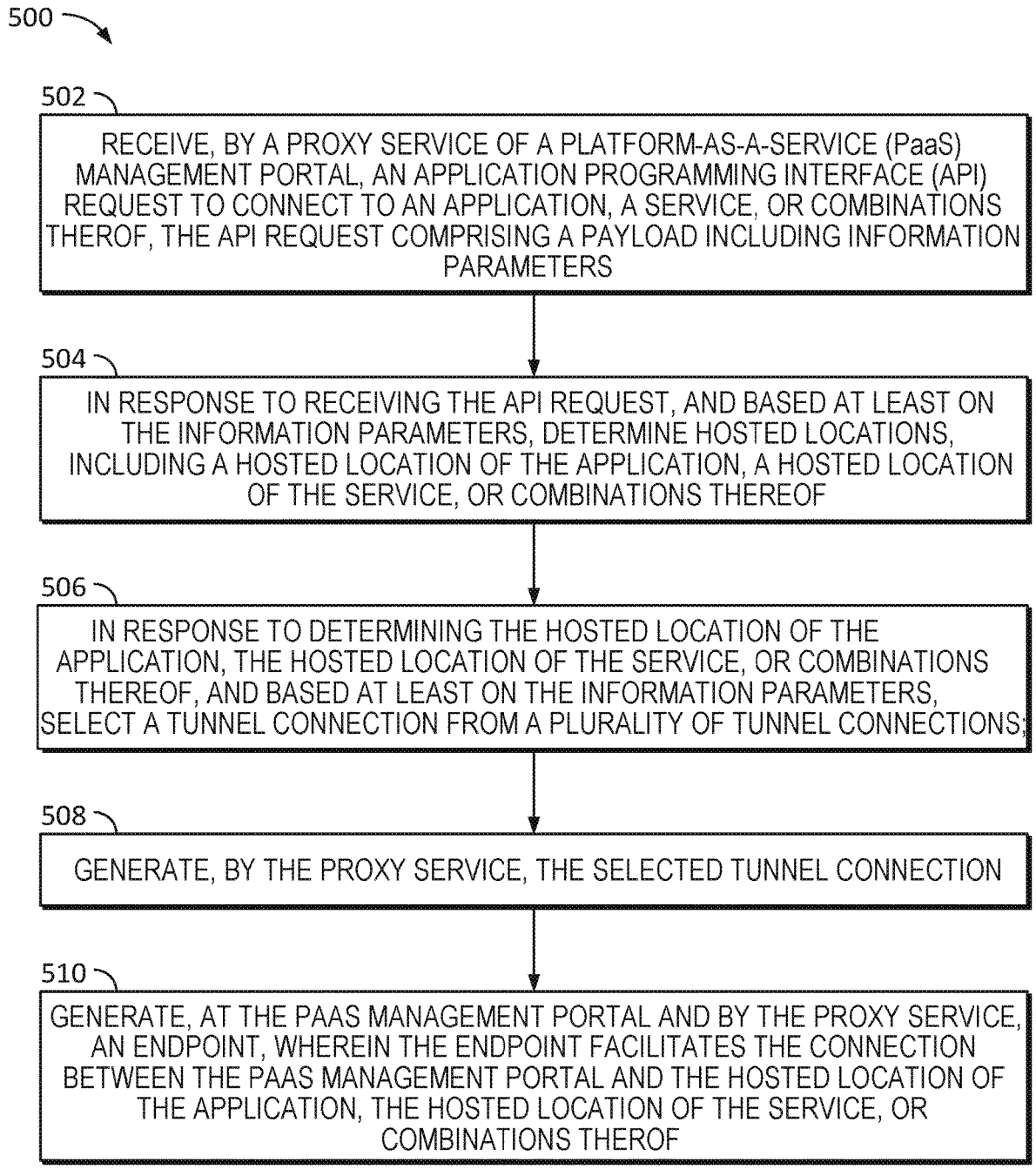
FIG. 5 is a flow diagram of a method 500 for generic proxying for distributed cloud native services, arranged in accordance with examples described herein.

FIG. 5 is a flow diagram of a method 500 for generic proxying for distributed cloud native services, arranged in accordance with examples described herein. This method 500 may be implemented, for example, using system 100 of FIG. 1.

The method 500 includes receiving, by a proxy service of a Platform-as-a-Service (PaaS) Management Portal, an Application Programming Interface (API) request to connect to an application, a service, or combinations thereof, the API request comprising a payload including information parameters in block 502, in response to receiving the API request, and based at least on the information parameters, determining hosted locations, including a hosted location of the application, a hosted location of the service, or combinations thereof in block 504, in response to determining the hosted location of the application, the hosted location of the service, or combinations thereof, and based at least on the information parameters, selecting a tunnel connection from a plurality of tunnel connections in block 506, generating, by the proxy service, the selected tunnel connection in block 508, and generating, at the PaaS Management Portal and by the proxy service, and API endpoint, wherein the API endpoint facilitates the connection between the PaaS Management Portal and the hosted location of the application, the hosted location of the service, or combinations thereof in block 510.

Block 502 recites receiving, by a proxy service of a Platform-as-a-Service (PaaS) Management Portal, an Application Programming Interface (API) request to connect to an application, a service, or combinations thereof, the API request comprising a payload including information parameters. In some examples, the information parameters included in the payload may comprise an application name, an application type, a service name, a service type, or combinations thereof. As described herein, in some examples, the PaaS Management Portal may be a centralized management plane for clusters and or cloud native services.

In some examples, an application type, a service type, or combinations thereof may include "project" for services deployed inside of a kubernetes project, "system" for services deployed outside of a kubernetes project (e.g., Kiali for Istio, Kubernetes dashboard, etc.), and/or "custom" for non-kubernetes services (e.g., Prism Element UI). In some examples, the payload may further comprise a project identification (e.g., projectId), a service name (e.g., serviceName), a service port (e.g., servicePort), service name space (e.g., serviceNamespace), computing system (206 or 208 or 210 from FIG. 2) id or service domain id (e.g., serviceDomainId), a session duration or a time interval (e.g., duration), basic setup authentication (e.g., setupBasicAuth), a rewrite rules Boolean (e.g., disableRewriterules), a DNS setup Boolean (e.g., setupDNS), a TLS endpoint Boolean (e.g., tlsEndpoint), a TLS certification Boolean (e.g., skipCertVerification), and headers (e.g., headers).

In some examples, the service name may be an IP address, a DNS name of the service to proxy, other names, or combinations thereof. In some examples, the session duration may be any duration, such as 30 minutes, 12 hours, etc. In some examples, the rewrite rules Boolean determines whether to set up an authentication mechanism (e.g., basic, advanced, etc.). In some examples, if the rewrite rules Boolean is set to true, the response will contain username and password required for authentication. In some examples, the rewrite rules Boolean determines whether to rewrite the rules. In some examples, the default may be set such that the system will add a rewrite rule to rewrite a generated HTTP path. In some examples, however, such rewrite may not work for some services and/or applications, and can be disabled (e.g., manually, by the system, etc.). In some examples, such rewrite functionality may be disabled by setting this flag to true.

In some examples, the DNS setup Boolean may determine whether to setup a custom endpoint (e.g., a custom DNS endpoint) for the proxy. In some examples, the TLS endpoint Boolean may determine whether to endpoint to proxy to is a TLS endpoint. In some examples, the TLS certification Boolean may determine whether to skip a TLS endpoint certificate verification. In some examples, TLS endpoint certificate verification may be skipped when tlsEndpoint is true. In some examples, the skipping of TLS endpoint certificate verification may be useful for self-signed certificates. In some examples, headers may be used as JSON representations of HTTP headers, and in some examples, may be used to overwrite currently existing headers.

As one example, an API request to connect to an application, a service, or combinations thereof (e.g., Kiali), may contain the following information:
name: kiali
type: SYSTEM
 projectId: " "
 serviceName: kiali
 servicePort: #####
 serviceNamespace: istio-system
 duration: 60 m
 svcDomainId: <id of SD>
 setupBasicAuth: false
 disableRewriteRules: true
 setupDNS: true
 tlsEndpoint: false
 skipCertVerification: false
 headers: " "

As another example, an API request to connect to an application, a service, or combinations thereof (e.g., a Simple-server), may contain the following information:
name: simple-server
type: PROJECT
 projectId: <id of project>
 serviceName: simple-server
 servicePort: ####
 serviceNamespace: " "
 duration: 30 m
 svcDomainId: <id of SD>
 setupBasicAuth: false
 disableRewriteRules: false
 setupDNS: false
 tlsEndpoint: false
 skipCertVerification: false
 headers: " "

As another example, an API request to connect to an application, a service, or combinations thereof (e.g., a Kubernetes dashboard), may contain the following information:
name: dashboard
type: SYSTEM
 projectId: " "
 serviceName: kubernetes-dashboard
 servicePort: 443
 serviceNamespace: kubernetes-dashboard
 duration: 60 m
 svcDomainId: <id of SD>
 setupBasicAuth: false
 disableRewriteRules: false
 setupDNS: true
 tlsEndpoint: true
 skipCertVerification: true
 headers: " "

As yet another example, an API request to connect to an application, a service, or combinations thereof (e.g., Prism Element UI), may contain the following information:
name: bowser-pe
type: CUSTOM
 projectId: " "
 serviceName: ##. ##. ###. ##
 servicePort: ####
 serviceNamespace: " "
 duration: 60 m
 svcDomainId: <id of SD>
 setupBasicAuth: false
 disableRewriteRules: false
 setupDNS: true
 tlsEndpoint: true
 skipCertVerification: true
 headers: "{\"Host\":\"bowser01-c1\"}"

Block 504 recites in response to receiving the API request, and based at least on the information parameters, determining hosted locations, including a hosted location of the application, a hosted location of the service, or combinations thereof. In some examples, the hosted locations are hosted behind a firewall. In some examples, the hosted locations are not located behind a firewall and/or accessible to the public without the need for authentication credentials. In some examples, the hosted locations point to applications and services located on the computing systems not managed by PaaS Manager.

Block 506 recites in response to determining the hosted location of the application, the hosted location of the service, or combinations thereof, and based at least on the information parameters, selecting a tunnel connection from a plurality of tunnel connections. In some examples, and as described herein, the selected connection may enable the proxy service of the PaaS Management Portal to route the API request from the PaaS Management Portal to a hosted location, such as for example, the hosted location of the application, the hosted location of the service, or combinations thereof.

Block 508 recites generating, by the proxy service, the selected tunnel connection. Block 510 recites generating, at the PaaS Management Portal and by the proxy service, and API endpoint, wherein the API endpoint facilitates the connection between the PaaS Management Portal and the hosted location of the application, the hosted location of the service, or combinations thereof.

Figure 6:
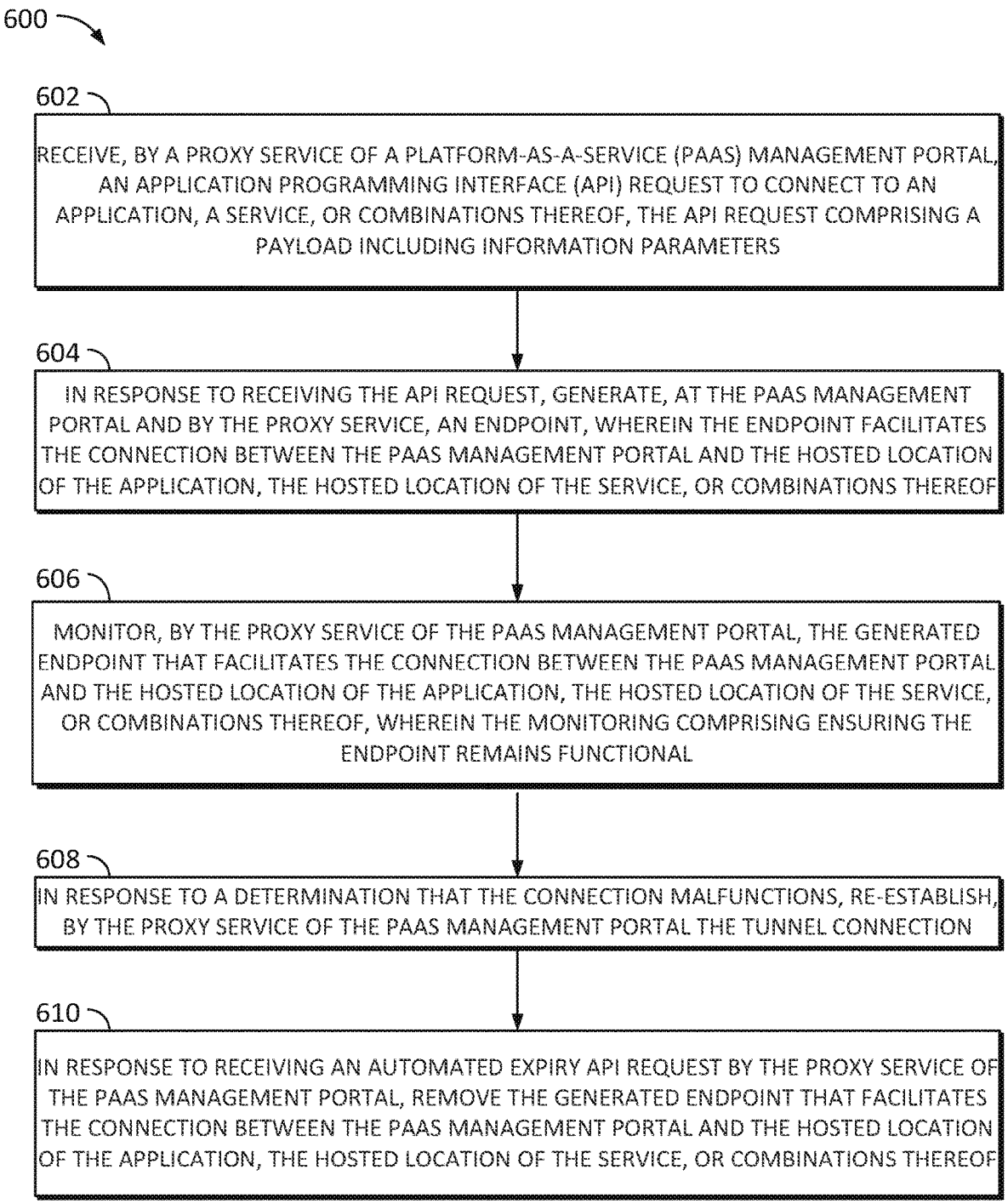
FIG. 6 is a flow diagram of a method 600 for life cycle management, including endpoint creation, monitoring, maintenance, and removal, arranged in accordance with examples described herein.

FIG. 6 is a flow diagram of a method 600 for life cycle management, including endpoint creation, monitoring, maintenance, and removal, arranged in accordance with examples described herein. This method 600 may be implemented, for example, using system 100 of FIG. 1.

The method 600 includes receiving, by a proxy service of a platform-as-a-service (PaaS) Management Portal, an application programming interface (API) request to connect to an application, a service, or combinations thereof, the API request comprising a payload including information parameters in block 602, in response to receiving the API request, generating, at the PaaS Management Portal and by the proxy service, an endpoint, wherein the endpoint facilitates the connection between the PaaS Management Portal and the hosted location of the application, the hosted location of the service, or combinations thereof in block 604, monitoring, by the proxy service of the PaaS Management Portal, the generated endpoint that facilitates the connection between the PaaS Management Portal and the hosted location of the application, the hosted location of the service, or combinations thereof, wherein the monitoring comprising ensuring the endpoint remains functional in block 606, in response to a determination that the connection malfunctions, re-establishing, by the proxy service of the PaaS Management Portal the tunnel connection in block 608, and in response to receiving an automated expiry API request by the proxy service of the PaaS Management Portal, removing the generated endpoint that facilitates the connection between the PaaS Management Portal and the hosted location of the application, the hosted location of the service, or combinations thereof in block 610.

Block 602 recites receiving, by a proxy service of a platform-as-a-service (PaaS) Management Portal, an application programming interface (API) request to connect to an application, a service, or combinations thereof, the API request comprising a payload including information parameters.

Block 604 recites in response to receiving the API request, generating, at the PaaS Management Portal and by the proxy service, an endpoint, wherein the endpoint facilitates the connection between the PaaS Management Portal and the hosted location of the application, the hosted location of the service, or combinations thereof.

Block 606 recites monitoring, by the proxy service of the PaaS Management Portal, the generated endpoint that facilitates the connection between the PaaS Management Portal and the hosted location of the application, the hosted location of the service, or combinations thereof, wherein the monitoring comprising ensuring the endpoint remains functional.

Block 608 recites in response to a determination that the connection malfunctions, re-establishing, by the proxy service of the PaaS Management Portal the tunnel connection.

Block 610 recites in response to receiving an automated expiry API request by the proxy service of the PaaS Management Portal, removing the generated endpoint that facilitates the connection between the PaaS Management Portal and the hosted location of the application, the hosted location of the service, or combinations thereof.

Various features described herein may be implemented in hardware, software executed by a processor, firmware, or any combination thereof. If implemented in software (e.g., in the case of the methods described herein), the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available non-transitory medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

From the foregoing it will be appreciated that, although specific embodiments of the disclosure have been described herein for purposes of illustration, various modifications may be made without deviating from the spirit and scope of the disclosure. Thus, the disclosure is not limited to the examples and designs described herein except as by the appended claims, and is to be accorded the broadest scope consistent with the principles and novel features disclosed herein.

What is claimed is:

1. At least one non-transitory computer-readable storage medium including instructions that when executed by a computing node in a computing system, cause the computing node to:
   receive, by a proxy service of a platform-as-a-service (PaaS) management portal, an Application Programming Interface (API) request to connect to an application, a service, or combinations thereof, the API request comprising a payload including information parameters;
   in response to receiving the API request, and based at least on the information parameters, determine hosted locations, including a hosted location of the application, a hosted location of the service, or combinations thereof;
   in response to determining the hosted location of the application, the hosted location of the service, or combinations thereof, and based at least on the information parameters, select a tunnel connection from a plurality of tunnel connections;
   generate, by the proxy service, the selected tunnel connection;
   generate, at the PaaS management portal and by the proxy service, an endpoint, wherein the endpoint, including a proxy service endpoint, a proxy application endpoint, or combinations thereof, facilitates a connection between the PaaS management portal and the hosted location of the application, the hosted location of the service, or combinations thereof; and
   in response to determining that the connection between the PaaS management portal and the hosted location of the application, the hosted location of the service, or combinations thereof malfunctions, re-establish, by the proxy service of the PaaS management portal, the connection facilitated by the endpoint.

2. The at least one non-transitory computer-readable storage medium of claim 1, wherein the information parameters include an application name, an application type, a service name, a service type, or combinations thereof.

3. The at least one non-transitory computer-readable storage medium of claim 1, wherein the hosted locations are hosted behind a firewall.

4. The at least one non-transitory computer-readable storage medium of claim 1, wherein the selected tunnel connection enables the proxy service to route the API request using a requested tunneling protocol from the proxy service endpoint or the proxy application endpoint hosted by the PaaS management portal to the hosted location of the application, the hosted location of the service, or combinations thereof.

5. The at least one non-transitory computer-readable storage medium of claim 1, wherein the PaaS management portal is a centralized management plane (MP) for clusters and cloud native services.

6. The at least one non-transitory computer-readable storage medium of claim 5, wherein the centralized MP is dynamically controlled by the endpoint, and wherein the endpoint is a public endpoint.

7. The at least one non-transitory computer-readable storage medium of claim 1, wherein the hosted location of the application, the hosted location of the service, or combinations thereof are located in a private data center not accessible from a public outside network.

8. The at least one non-transitory computer-readable storage medium of claim 1, wherein the endpoint is secure, is multi-tenant, includes access control support, is protected by at least one of a plurality of authentication mechanisms, or is a combination thereof.

9. The at least one non-transitory computer-readable storage medium of claim 1, the computing node further caused to:
receive, at the proxy service of the PaaS management portal and from an agent located at the hosted location of the application, the hosted location of the service, or combinations thereof, at an HTTPS connection of a plurality of HTTPS connections, the HTTPS connection directed to the endpoint.

10. The at least one non-transitory computer-readable storage medium of claim 1, the computing node further caused to:
determine, by the proxy service of the PaaS management portal, a time interval of access for the connection between the PaaS management portal and the hosted location of the application, the hosted location of the service, or combinations thereof.

11. The at least one non-transitory computer-readable storage medium of claim 1, the computing node further caused to:
in response to receiving an automated expiry API request by the proxy service of the PaaS management portal, removing the endpoint that facilitates the connection between the PaaS management portal and the hosted location of the application, the hosted location of the service, or combinations thereof.

12. At least one non-transitory computer-readable storage medium including instructions that when executed by a computing node in a computing system, cause the computing node to:
receive, by a proxy service of a platform-as-a-service (PaaS) management portal, an Application Programming Interface (API) request to connect to an application, a service, or combinations thereof, the API request comprising a payload including information parameters;
in response to receiving the API request, and based at least on the information parameters, determine hosted locations, including a hosted location of the application, a hosted location of the service, or combinations thereof;
in response to determining the hosted location of the application, the hosted location of the service, or combinations thereof, and based at least on the information parameters, select a tunnel connection from a plurality of tunnel connections;
generate, by the proxy service, the selected tunnel connection;
generate, at the PaaS management portal and by the proxy service, an endpoint, wherein the endpoint, including a proxy service endpoint, a proxy application endpoint, or combinations thereof, facilitates a connection between the PaaS management portal and the hosted location of the application, the hosted location of the service, or combinations thereof,
wherein the selected tunnel connection enables the proxy service to route the API request using a tunneling protocol from the proxy service endpoint or the proxy application endpoint hosted by the PaaS management portal to the hosted location of the application or the hosted location of the service; and
dynamically add, by the proxy service of the PaaS management portal, routing rules to direct information traffic between the proxy service endpoint or the proxy application endpoint hosted by the PaaS management portal and the hosted location of the application, the hosted location of the service, or combinations thereof, wherein the routing rules include Ingress rules.

13. At least one non-transitory computer-readable storage medium including instructions that when executed by a computing node in a computing system, cause the computing node to:
receive, by a proxy service of a platform-as-a-service (PaaS) management portal, an Application Programming Interface (API) request to connect to an application, a service, or combinations thereof, the API request comprising a payload including information parameters;
in response to receiving the API request, and based at least on the information parameters, determine hosted locations, including a hosted location of the application, a hosted location of the service, or combinations thereof;
in response to determining the hosted location of the application, the hosted location of the service, or combinations thereof, and based at least on the information parameters, select a tunnel connection from a plurality of tunnel connections;
generate, by the proxy service, the selected tunnel connection;
generate, at the PaaS management portal and by the proxy service, an endpoint, wherein the endpoint, including a proxy service endpoint, a proxy application endpoint, or combinations thereof, facilitates a connection between the PaaS management portal and the hosted location of the application, the hosted location of the service, or combinations thereof,
wherein the selected tunnel connection enables the proxy service to route the API request using a tunneling protocol from the proxy service endpoint or the proxy application endpoint hosted by the PaaS management portal to the hosted location of the application or the hosted location of the service; and
monitor, by the proxy service of the PaaS management portal, the endpoint that facilitates the connection between the PaaS management portal and the hosted location of the application, the hosted location of the service, or combinations thereof, wherein the monitoring comprises ensuring the endpoint remains functional.

14. A system comprising:
at least one processor;
memory coupled to the at least one processor, the memory encoded with instructions for a proxy service; and
the proxy service, communicatively coupled to a Platform-as-a-Service (PaaS) management portal, and configured to receive an Application Programming Interface (API) request, from a requesting application, a requesting service, or combinations thereof, to connect to a plurality of clusters, a plurality of cloud native services, or combinations thereof, located in a plurality of hosted locations, the API request comprising a payload including information parameters;

the proxy service further configured to determine, based at least on receiving the API request including the information parameters, the plurality of hosted locations of the plurality of clusters, the plurality of cloud native services, or combinations thereof;

the proxy service further configured to select, based at least on receiving the API request, a tunnel connection of a plurality of tunnel connections;

the proxy service further configured to generate, based on receiving the API request including the information parameters, a proxy service endpoint, a proxy application endpoint, or combinations thereof, at the PaaS management portal that facilitates a connection between the requesting application, the requesting service, or combinations thereof, and the plurality of clusters, the plurality of cloud native services, or combinations thereof, located in the plurality of hosted locations; and the proxy service is further configured to, in response to determining that the connection between the PaaS management portal and the hosted location of the application, the hosted location of the service, or combinations thereof malfunctions, re-establish, by the proxy service of the PaaS management portal, the connection facilitated by the proxy service endpoint, the proxy application endpoint, or combinations thereof.

15. The system of claim 14, wherein the proxy service is further configured to select the tunnel connection of the plurality of tunnel connections that connects between the proxy service endpoint, the proxy application endpoint, or combinations thereof, hosted at the PaaS management portal and the plurality of hosted locations, wherein the selection is based at least on the information parameters.

16. The system of claim 14, wherein the proxy service is further configured to generate the selected tunnel connection of the plurality of tunnel connections that connects between the proxy service endpoint, the proxy application endpoint, or combinations thereof, hosted at the PaaS management portal and the plurality of hosted locations, based at least on receiving the API request including the information parameters.

17. The system of claim 14, wherein the API request is a user input, and wherein the user input comprises the payload containing the information parameters.

18. The system of claim 14, wherein the information parameters comprise an application name, an application type, a service name, a service type, a hosted application location identifier, a hosted service location identifier, or combinations thereof.

19. The system of claim 14, wherein the plurality of hosted locations are located in a private data center not accessible from a public outside network.

20. The system of claim 14, wherein the endpoint is a first endpoint of a plurality of endpoints, the first endpoint being a public endpoint, and wherein the first endpoint is secure, multi-tenant, includes access control support, is protected by at least one of a plurality of authentication mechanisms, or combinations thereof.

21. The system of claim 14, wherein the proxy service is further configured to, in response to receiving an automated expiry API request by the proxy service of the PaaS management portal, removing the endpoint that facilitates the connection between the PaaS management portal and the hosted location of the application, the hosted location of the service, or combinations thereof.

22. A system comprising:
at least one processor;
memory coupled to the at least one processor, the memory encoded with instructions for a proxy service; and
the proxy service, communicatively coupled to a Platform-as-a-Service (PaaS) management portal, and configured to receive an Application Programming Interface (API) request, from a requesting application, a requesting service, or combinations thereof, to connect to a plurality of clusters, a plurality of cloud native services, or combinations thereof, located in a plurality of hosted locations, the API request comprising a payload including information parameters;
the proxy service further configured to determine, based at least on receiving the API request including the information parameters, the plurality of hosted locations of the plurality of clusters, the plurality of cloud native services, or combinations thereof;
the proxy service further configured to select, based at least on receiving the API request, a tunnel connection of a plurality of tunnel connections;
the proxy service further configured to generate, based on receiving the API request including the information parameters, a proxy service endpoint, a proxy application endpoint, or combinations thereof, at the PaaS management portal that facilitates a connection between the requesting application, the requesting service, or combinations thereof, and the plurality of clusters, the plurality of cloud native services, or combinations thereof, located in the plurality of hosted locations,
wherein the selected tunnel connection of the plurality of tunnel connections enables the proxy service to route the API request using a tunneling protocol from the proxy service endpoint or the proxy application endpoint hosted by the PaaS management portal to the plurality of hosted locations; and
wherein the proxy service is further configured to dynamically add routing rules to direct information traffic using the connection between the proxy service endpoint, the proxy application endpoint, or combinations thereof, at the PaaS management portal and the plurality of hosted locations.

23. A system comprising:
at least one processor;
memory coupled to the at least one processor, the memory encoded with instructions for a proxy service; and
the proxy service, communicatively coupled to a Platform-as-a-Service (PaaS) management portal, and configured to receive an Application Programming Interface (API) request, from a requesting application, a requesting service, or combinations thereof, to connect to a plurality of clusters, a plurality of cloud native services, or combinations thereof, located in a plurality of hosted locations, the API request comprising a payload including information parameters;
the proxy service further configured to determine, based at least on receiving the API request including the information parameters, the plurality of hosted locations of the plurality of clusters, the plurality of cloud native services, or combinations thereof;
the proxy service further configured to select, based at least on receiving the API request, a tunnel connection of a plurality of tunnel connections;
the proxy service further configured to generate, based on receiving the API request including the information parameters, a proxy service endpoint, a proxy application endpoint, or combinations thereof, at the PaaS management portal that facilitates a connection between the requesting application, the requesting service, or combinations thereof, and the plurality of clusters, the plurality of cloud native services, or combinations thereof, located in the plurality of hosted locations, wherein the selected tunnel connection of the plurality of tunnel connections enables the proxy service to route the API request using a tunneling protocol from the proxy service endpoint or the proxy application endpoint hosted by the PaaS management portal to the plurality of hosted locations; and wherein the proxy service is further configured to monitor, by the proxy service of the PaaS management portal, the endpoint that facilitates the connection between the PaaS management portal and the hosted location of the application, the hosted location of the service, or combinations thereof, wherein the monitoring comprises ensuring the endpoint remains functional.

* * * * *